May 19, 1936.  A. OBERHOFFKEN  2,040,872

MACHINE TOOL

Filed April 30, 1934  14 Sheets-Sheet 2

INVENTOR
Alexander Oberhoffken
By Chindahl, Parker + Carlson
ATTORNEYS

May 19, 1936. A. OBERHOFFKEN 2,040,872

MACHINE TOOL

Filed April 30, 1934 14 Sheets-Sheet 3

INVENTOR
Alexander Oberhoffken
By Clindall, Parker Carlson
ATTORNEYS

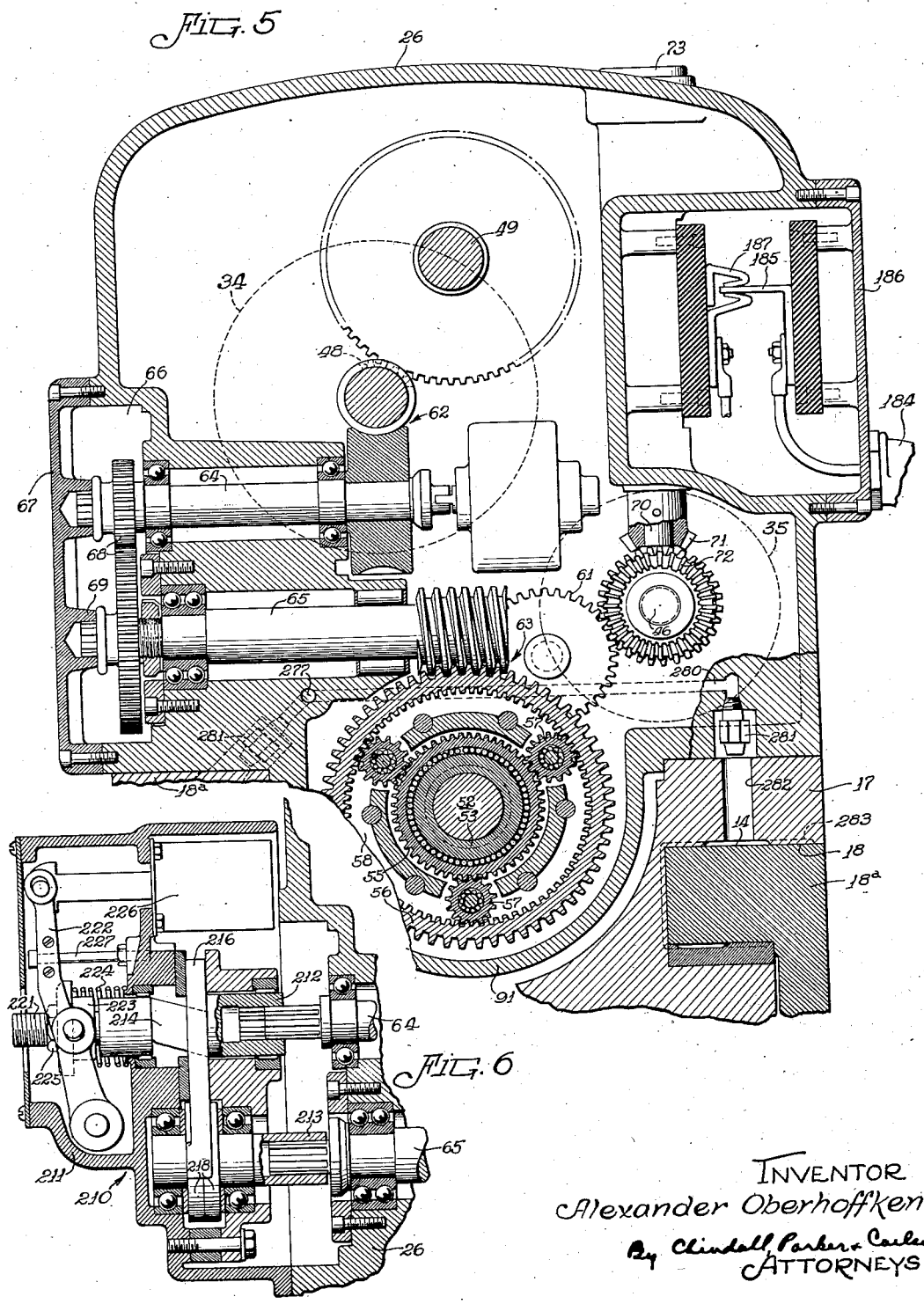

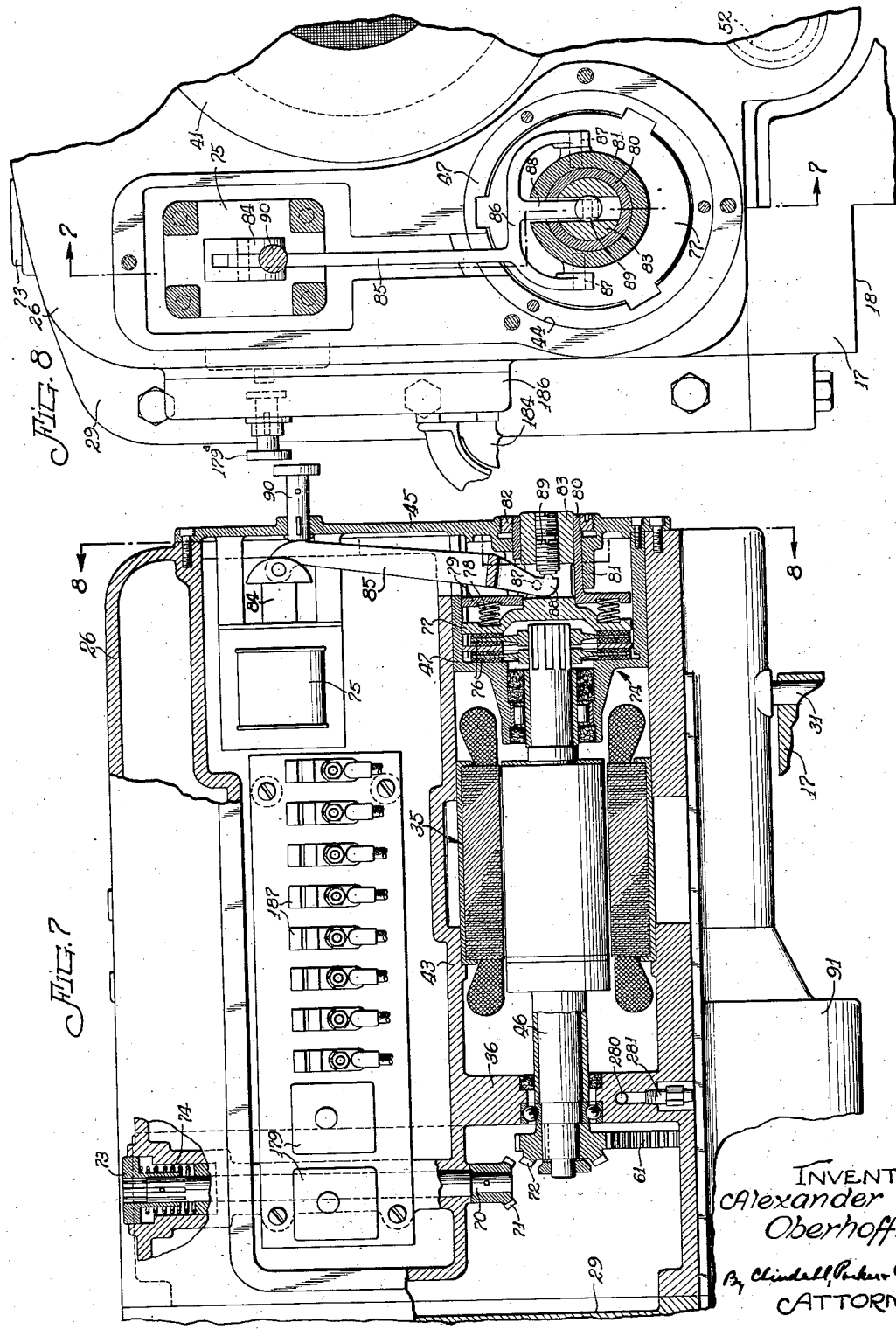

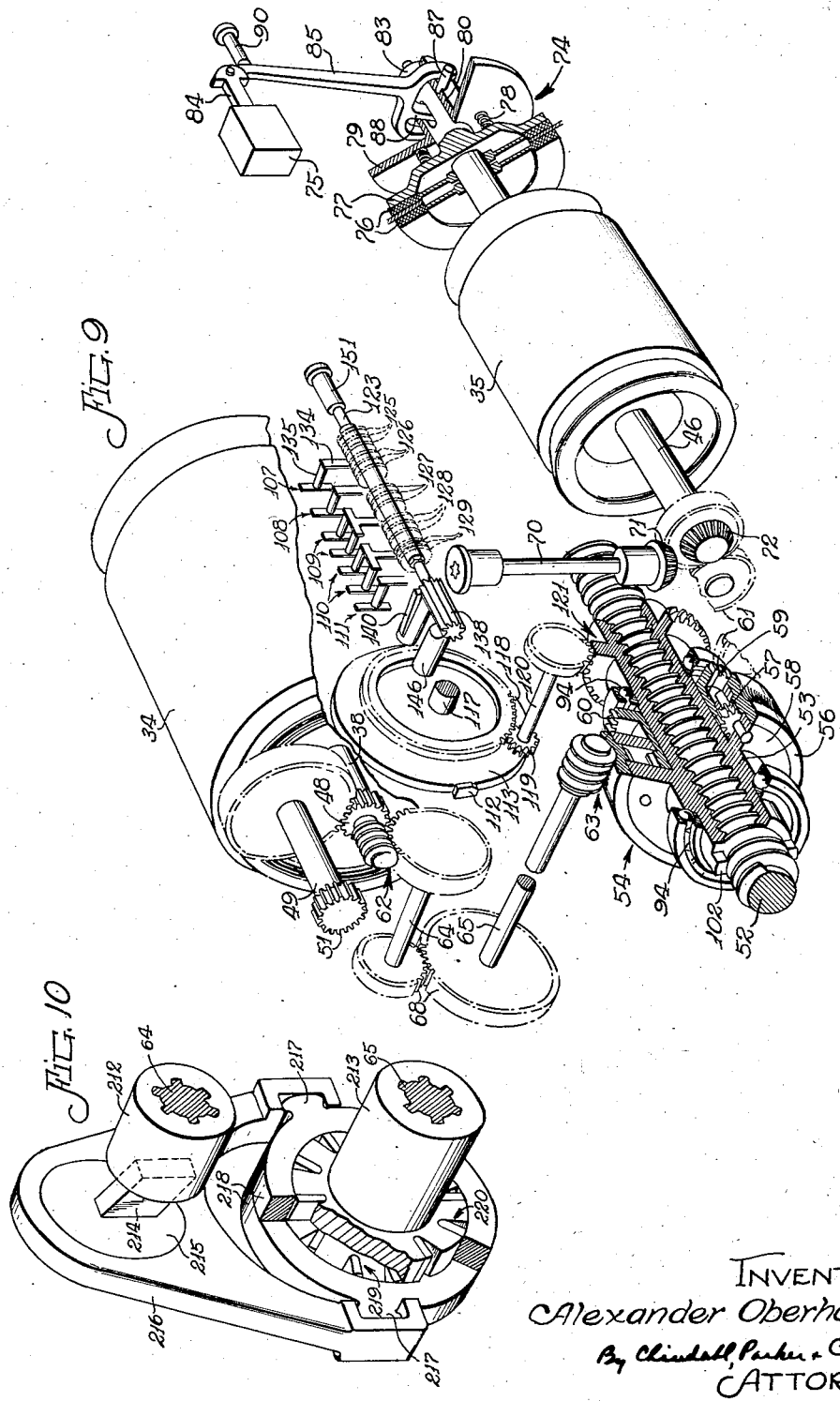

May 19, 1936.  A. OBERHOFFKEN  2,040,872
MACHINE TOOL
Filed April 30, 1934  14 Sheets-Sheet 7

INVENTOR
Alexander Oberhoffken
By Lindell, Parker & Carlson
ATTORNEYS

May 19, 1936.  A. OBERHOFFKEN  2,040,872
MACHINE TOOL
Filed April 30, 1934   14 Sheets—Sheet 8
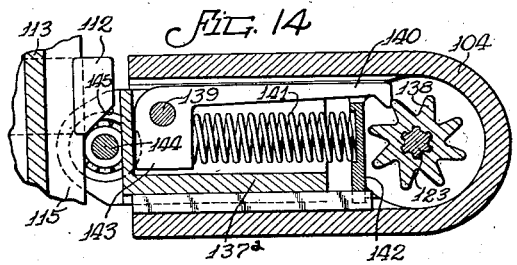
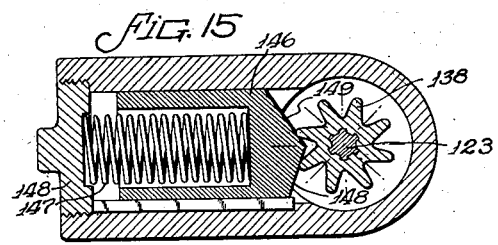
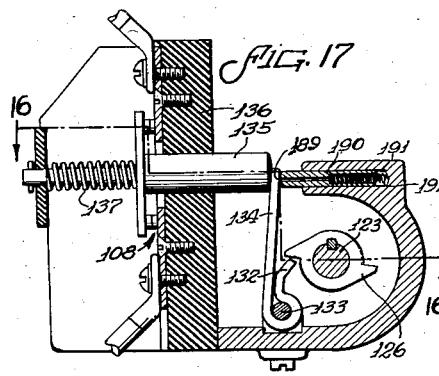
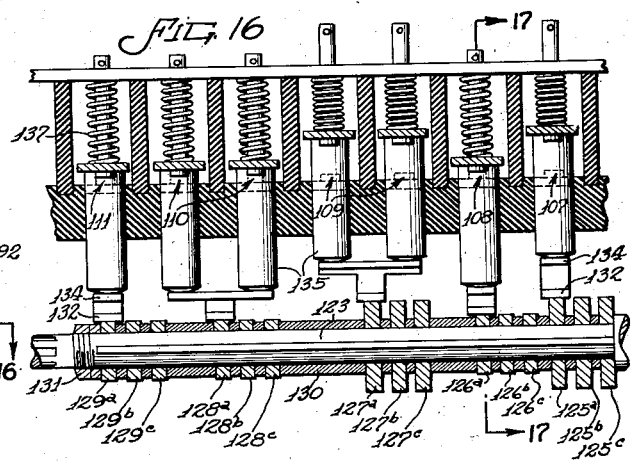
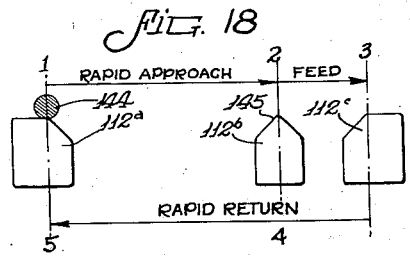
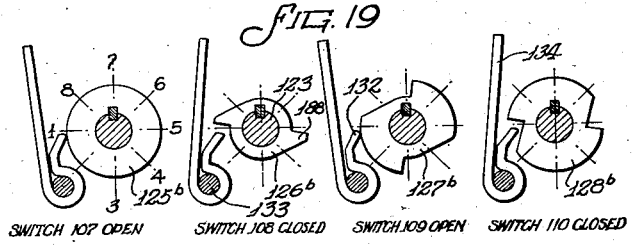
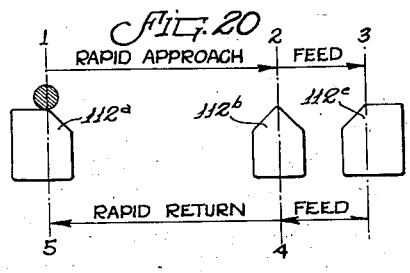
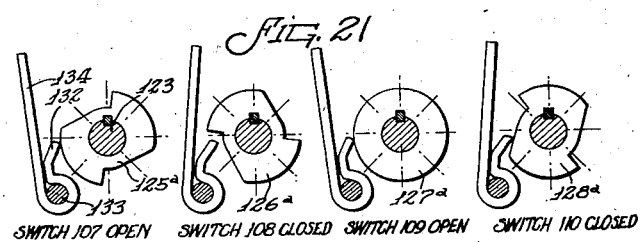
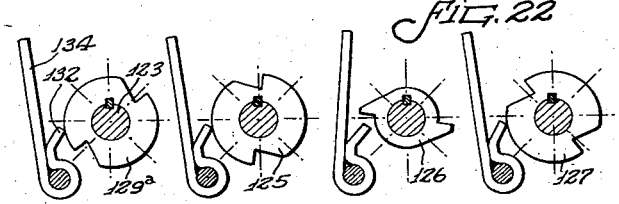
INVENTOR
Alexander Oberhoffken
By Chindall, Parker, Carlson
ATTORNEYS

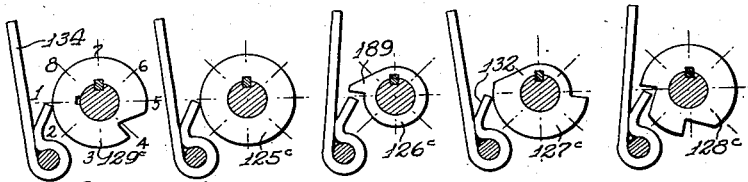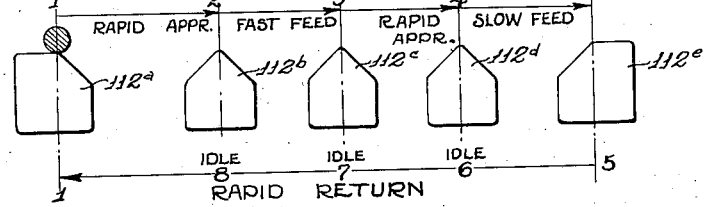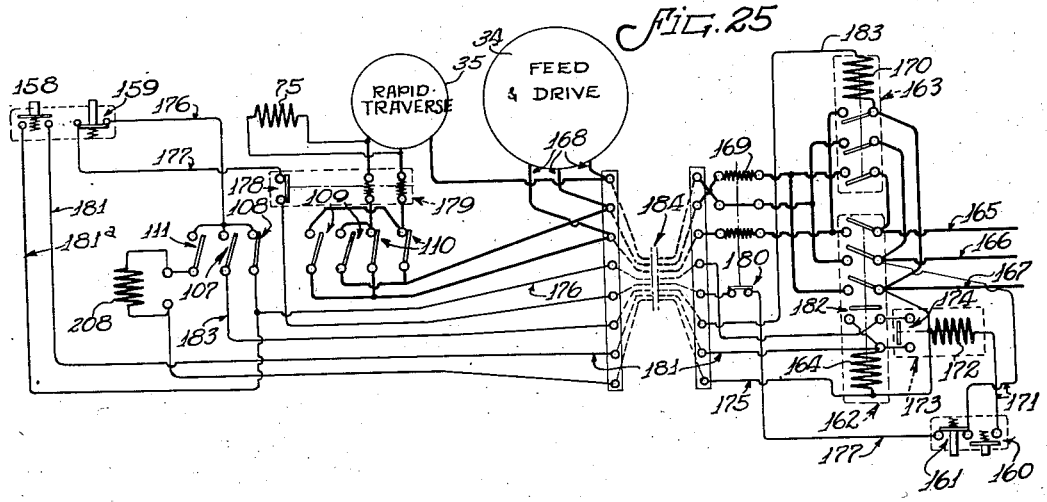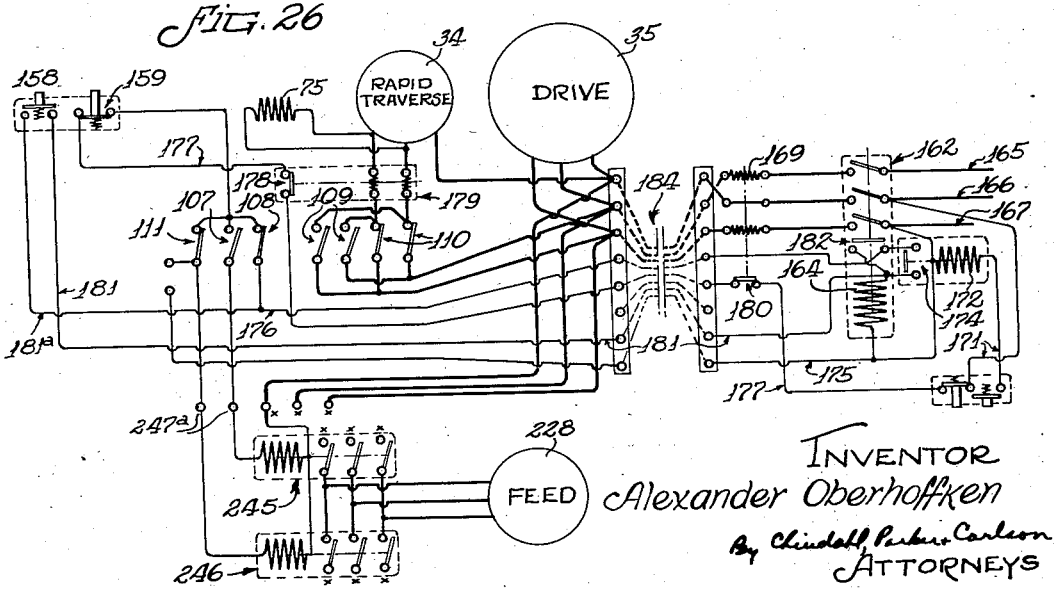

May 19, 1936.   A. OBERHOFFKEN   2,040,872
MACHINE TOOL
Filed April 30, 1934   14 Sheets-Sheet 10

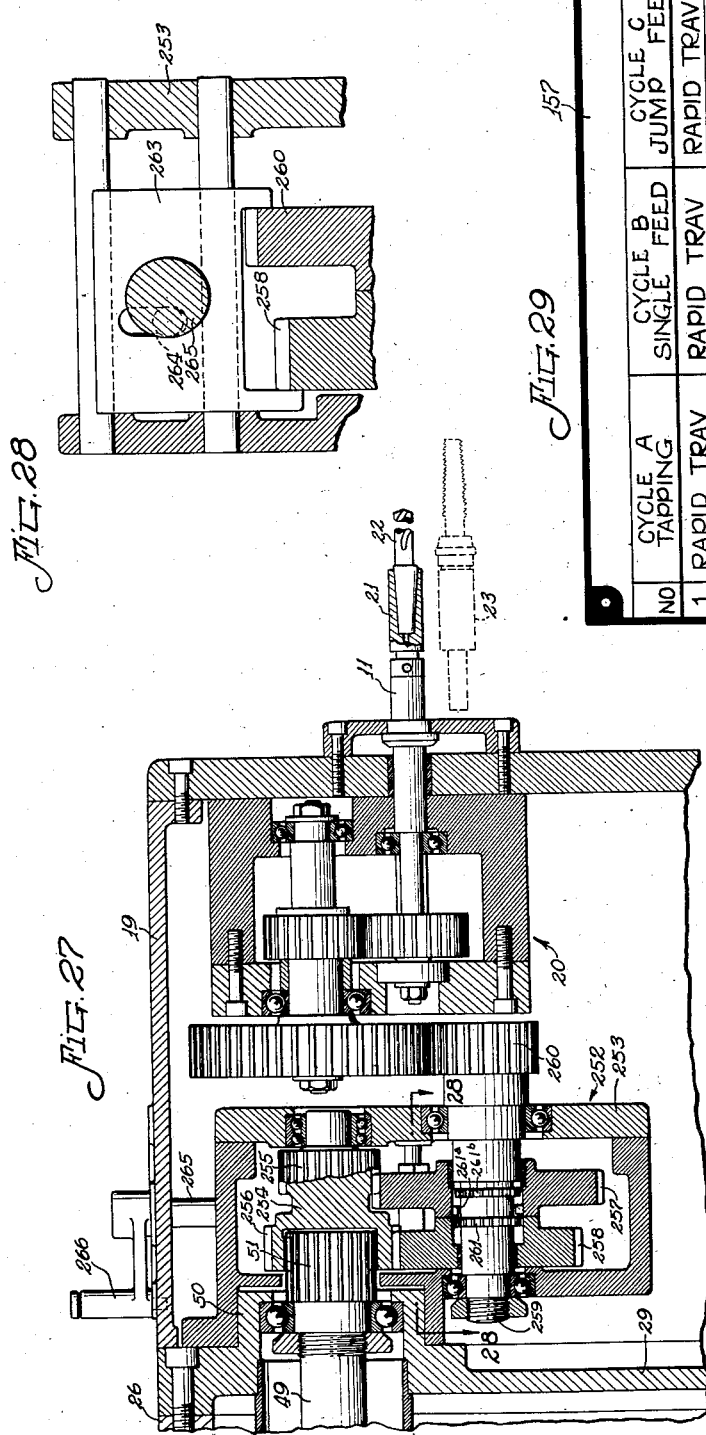

| NO | CYCLE A TAPPING | CYCLE B SINGLE FEED | CYCLE C JUMP FEED |
|---|---|---|---|
| 1 | RAPID TRAV | RAPID TRAV | RAPID TRAV |
| 2 | FEED FWD | FEED | FEED NO.1 |
| 3 | FEED RET | RAPID RET 1 | RAPID TRAV |
| 4 | RAPID RET | RAPID RET 2 | FEED NO.2 |
| 5 | RAPID TRAV | RAPID TRAV | RAPID RET 1 |
| 6 | FEED FWD | FEED | RAPID RET 2 |
| 7 | FEED RET | RAPID RET 1 | RAPID RET 3 |
| 8 | RAPID RET | RAPID RET 2 | RAPID RET 4 |

INVENTOR
Alexander Oberhoffken
By Clindall Parker Carlson
ATTORNEYS

May 19, 1936. A. OBERHOFFKEN 2,040,872
MACHINE TOOL
Filed April 30, 1934 14 Sheets-Sheet 11

INVENTOR
Alexander Oberhoffken
By Chindell, Parker & Carlson
ATTORNEYS

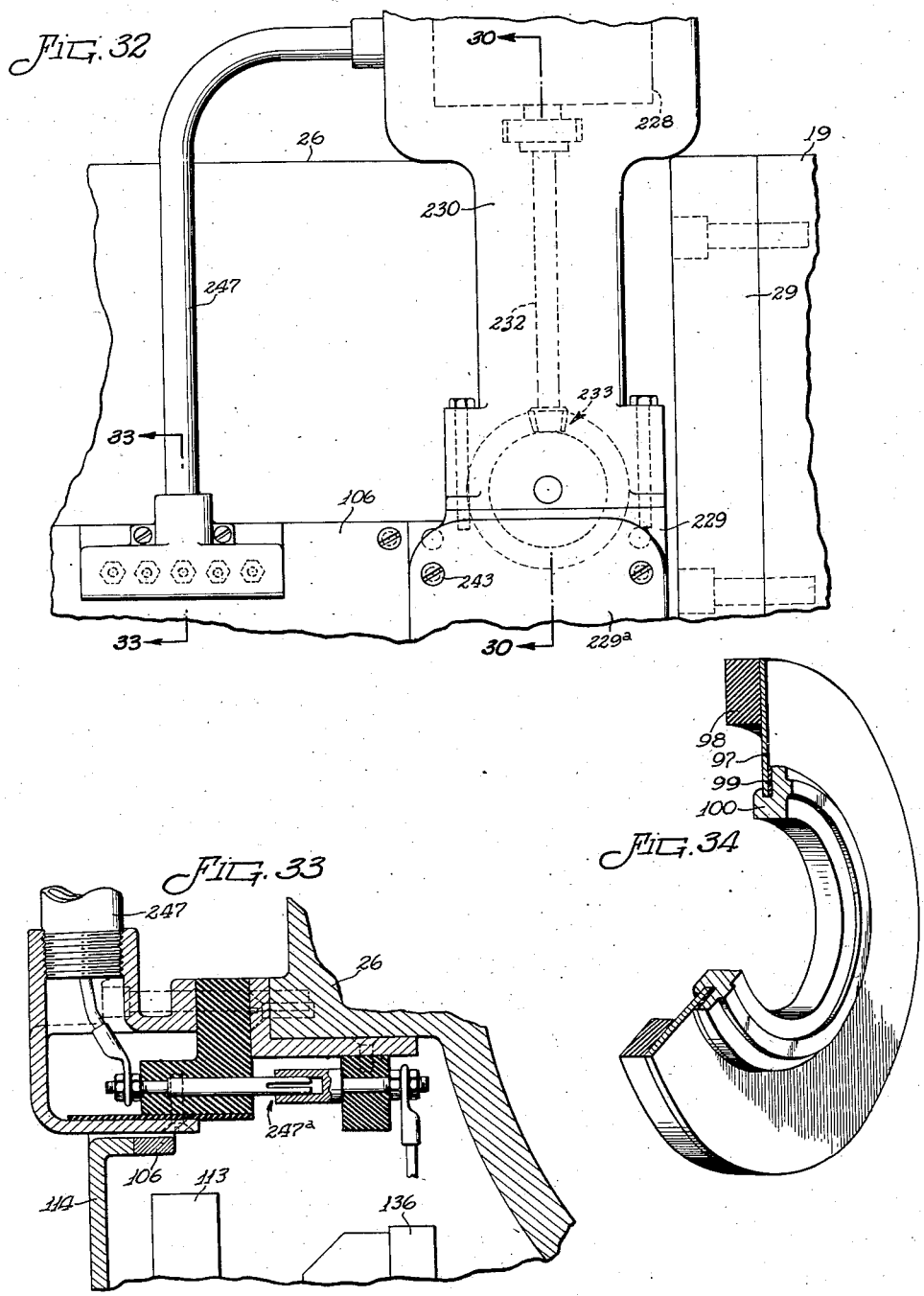

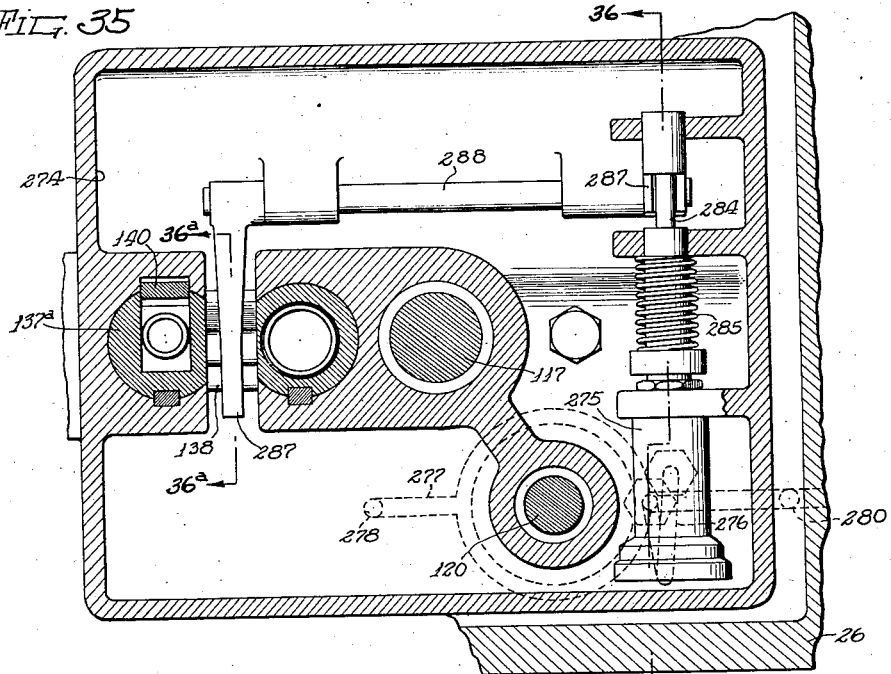

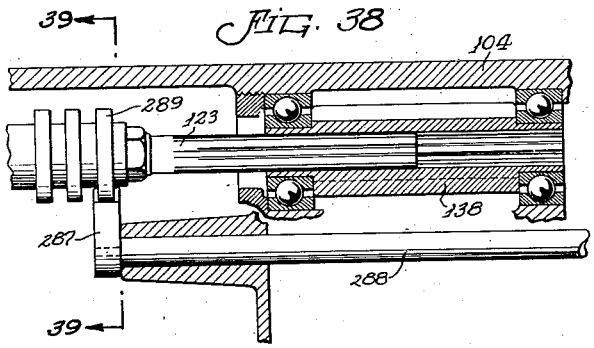
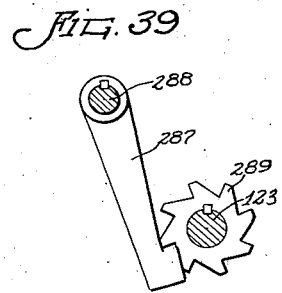
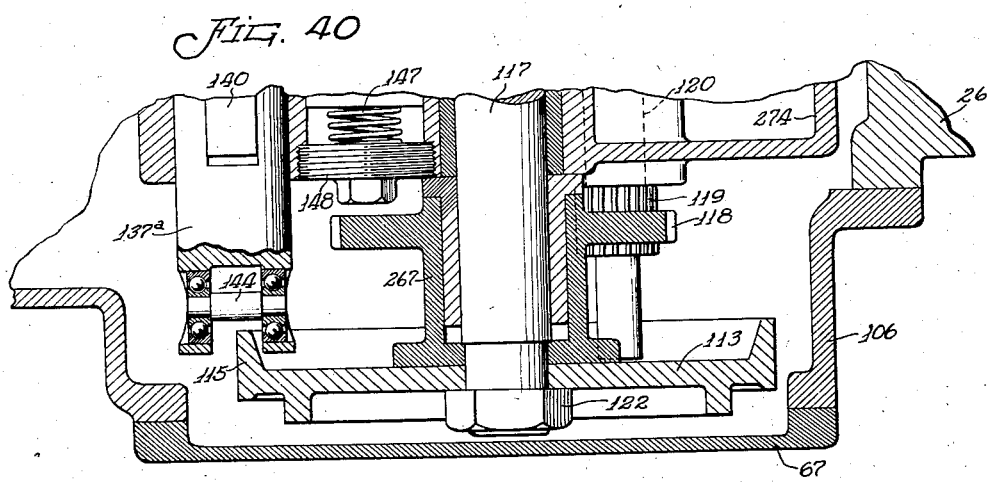
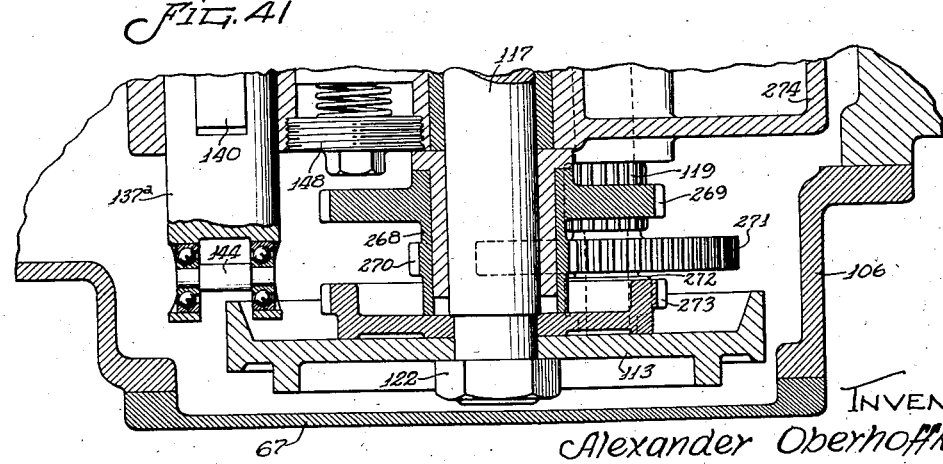

Patented May 19, 1936

2,040,872

UNITED STATES PATENT OFFICE 2,040,872

MACHINE TOOL

Alexander Oberhoffken, Rockford, Ill., assignor to The Ingersoll Milling Machine Company, Rockford, Ill., a corporation of Illinois Application April 30, 1934, Serial No. 723,136

72 Claims. (Cl. 29—26)

This invention relates to a general purpose machine tool for performing various metal-removing processes such as drilling, milling, tapping, boring, reaming, etc.

An important object of the present invention is to provide in an automatic machine tool a novel construction and arrangement of parts for effecting the tool driving, relative tool and work feeding and cycle controlling functions so that the machine tool may be utilized to perform a wide variety of metal-removing processes in widely variable cycles of feed and rapid traverse motions.

A more detailed object is to provide an automatic machine in which the main parts of the power driving mechanism are formed as a unitary assembly and the parts which are subject to wear or deterioration or those which are of special design for different types of processes or cycles to be performed are formed as demountable sub-assemblies or units adapted to be associated interchangeably with the main unit.

In practice it frequently happens that several different metal-removing processes must be performed upon the same portions of a work piece. For example, a number of holes may be formed in a work piece in a drilling operation after which the same holes must be tapped, reamed or otherwise finished. Where production requirements permit, a substantial saving in capital investment may be effected by performing several of such operations in one machine. Accordingly, another object of the present invention is to provide a machine tool which can be converted quickly and conveniently in the machine shop from a machine for performing one process such as drilling to one for performing a different process such as tapping, both processes being carried on at optimum efficiency.

The invention also resides in the novel character of the mechanisms by which such conversion is effected.

A further object is to incorporate in an automatic machine tool a novel mechanism by which the machine may be adapted selectively for the performance of any one of a number of different combinations of feed and rapid traverse motions.

It is also an object of the invention to provide a novel arrangement of electric circuits and controls therefor in a machine tool driven by electric motors in automatic cycles which are defined by the selective operation of the motors whereby to provide for convenience in the control of the machine tool and insure safety in its operation.

The invention also resides in the novel character of the various sub-assemblies above referred to and the manner of associating the same with the main power unit.

Still another object is to provide a novel means for lubricating the slideways and various power driven parts in an automatic machine tool.

Other objects and advantages of the invention will become apparent from the following detailed description taken in connection with the accompanying drawings, in which Figure 1 is a perspective view of a machine tool embodying the features of the present invention.

Fig. 1ᵃ is a perspective view showing a set of milling tools for use in the machine shown in Fig. 1.

Fig. 1ᵇ is a similar view showing a set of tapping tools.

Fig. 5 is a fragmentary sectional view taken along the line 5—5 of Fig. 4.

Fig. 6 is a fragmentary section similar to Fig. 5 showing a modified form of feed drive mechanism.

Fig. 7 is a fragmentary sectional view taken along the line 7—7 of Fig. 8.

Fig. 8 is a fragmentary sectional view taken along the line 8—8 of Fig. 7.

Fig. 9 is a perspective view of the driving motors and the power connections extending therefrom.

Fig. 10 is a fragmentary perspective view of part of the mechanism shown in Fig. 6.

Figure 12:
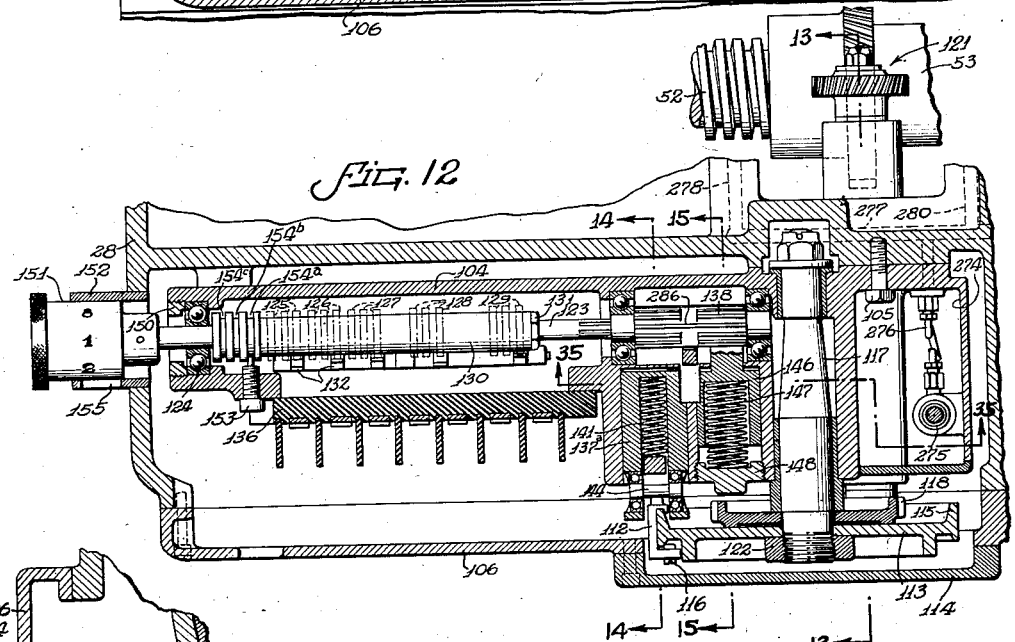
Fig. 12 is a sectional view taken along the line 12—12 of Fig. 11.
Figure 13:
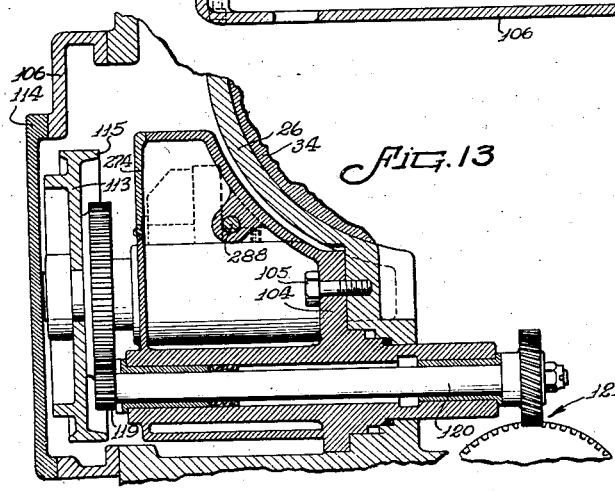

Figs. 13, 14 and 15 are fragmentary sections taken respectively along the lines 13—13, 14—14, and 15—15 of Fig. 12.

Fig. 16 is a fragmentary section taken along the line 16—16 of Fig. 17.

Fig. 17 is a section taken along the line 17—17 of Fig. 16.

Fig. 18 shows an arrangement of the control dogs for a drilling or milling cycle.

Fig. 19 shows the construction of the cams for defining the cycle shown in Fig. 18.

Fig. 20 shows a control dog arrangement for a tapping cycle.

Fig. 21 shows the construction of the cams for defining the cycle shown in Fig. 20.

Figs. 22 and 23 show the construction of the cams for defining different types of cycles.

Fig. 24 shows the arrangement of control dogs for use with the cams shown in Fig. 23.

Fig. 25 is a schematic view and wiring diagram.

Fig. 26 shows a modified wiring diagram for use with the cam arrangement shown in Fig. 22.

Fig. 27 is a fragmentary vertical sectional view through a tool unit showing the modified form of tool driving mechanism.

Fig. 28 is a fragmentary section taken along the line 28—28 of Fig. 27.

Fig. 29 is a table showing the parts of different machining cycles.

Figures 30, 31:
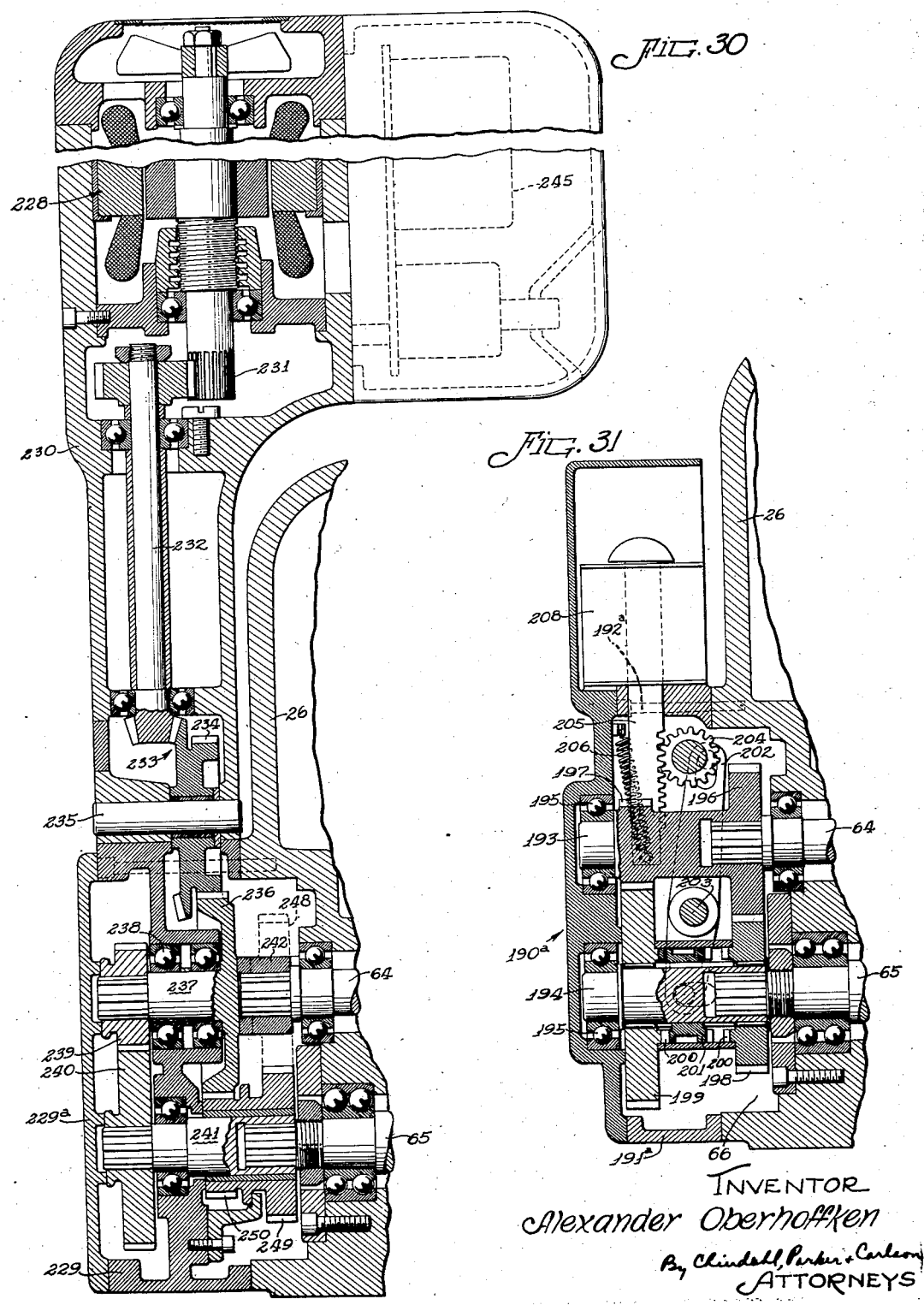

Fig. 30 is a fragmentary section taken along the line 30—30 of Fig. 32 showing a modified form of tool feeding mechanism.

Fig. 31 is a view similar to Fig. 6 showing another modified form of speed change mechanism.

Fig. 32 is a fragmentary elevational view of the mechanism shown in Fig. 30.

Fig. 33 is a section taken along the line 33—33 of Fig. 32.

Fig. 34 is a perspective view partially in section of an oil seal.

Fig. 35 is a sectional view taken along the line 35—35 of Fig. 12.

Fig. 36 is a composite section taken in part along the line 36—36 and in part along the line 36ª—36ª of Fig. 35.

Fig. 37 is a schematic view showing the lubricant distributing mechanism.

Figure 11:
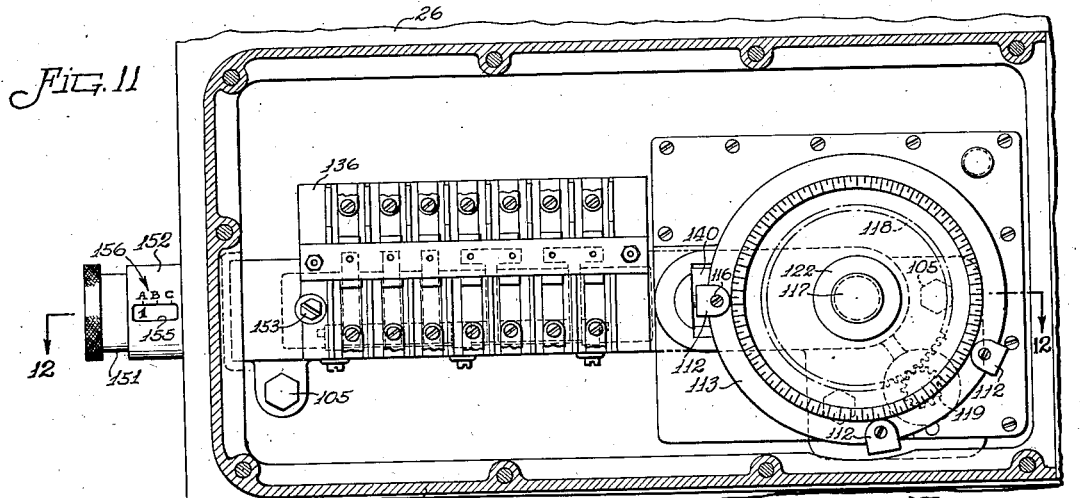
Fig. 11 is a fragmentary side elevational view of the power unit shown in Fig. 1 with one of the cover plates removed.

Fig. 38 is a fragmentary sectional view taken along the line 12—12 of Fig. 11 illustrating the modified form of means for actuating the lubricating pump.

Fig. 39 is a section taken along the line 39—39 of Fig. 38.

Figs. 40 and 41 are fragmentary views similar to Fig. 12 showing modified forms of drive for the timing arrangement of the control mechanism.

The drawings illustrate the invention in a horizontal one-way machine tool by which drilling, milling, tapping, boring, and allied operations may be performed upon a work piece 10 by tools carried by rotatable spindles 11. For such processes, the work piece is usually stationarily supported by being clamped in a suitable fixture 12 mounted upon a pedestal 13, and the spindles are rotatably supported on a unitary head structure which is arranged to slide bodily relative to the work along parallel ways 14 on the machine bed 13ª. While the invention is especially adapted for machine tools of this general character, it is susceptible of application to other types of metal-removing processes and may be used to effect movement of other kinds of machine elements such for example as a slidable work table. It is to be understood, therefore, that I do not intend to limit the invention by the present exemplary disclosure but aim to cover all modifications and alternative constructions falling within the spirit and scope of the invention as expressed in the appended claims.

In the exemplary machine shown, all of those machine tool functions which involve power driven or moving parts, including driving of the tools, effecting relative feed, rapid approach, and rapid return motions between the tool and the work, and automatically defining cycles of these motions, are performed by mechanism incorporated in the tool head which herein comprises a self-contained power unit 15 and a demountable tool or spindle-carrying unit 16 preferably made structurally separate from each other and readily demountable from their common support which comprises an elongated saddle or carriage 17 having surfaces 18 complemental to and fitting slidably on the ways 14 so as to be guided accurately thereby. Preferably the power unit is detachably secured to one end of the saddle 17 and cooperates with the other end to form a cradle in which the tool-carrying unit 16 is interchangeably mounted. With the power and tool-carrying units thus constructed and arranged, either may be removed and replaced without disturbing the relation of the saddle and ways and different tool units may be used thereby adapting the machine for a wide variety of metal-removing processes.

Herein the tool unit 16 comprises a gear box 19 containing speed reduction gearing 20 for transmitting rotary motion from the power unit to the spindles 11 projecting from and rotatably supported in one wall of the gear box. For a purpose to appear later, the spindles are adapted to receive interchangeably chucks 21 for drilling tools 22 or collets 23 in which tapping tools 24 are yieldably mounted in the usual way for a limited amount of endwise movement. The spindles may also be adapted to receive milling cutter units 25.

Figure 4:
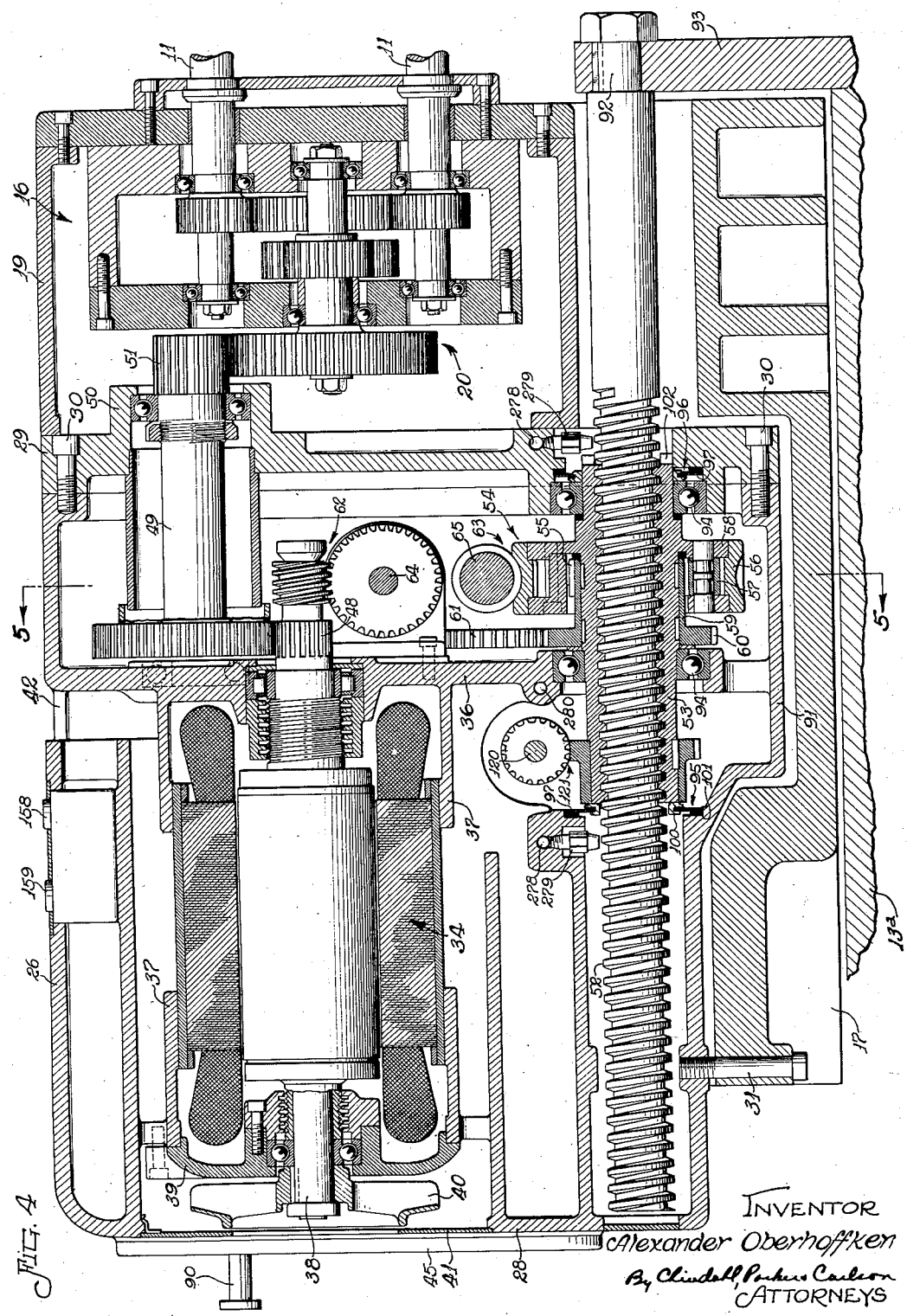
Fig. 4 is a fragmentary sectional view of the machine tool taken along the vertical plane through the center of the power unit.

In order to enclose the operating parts of the power unit 15 and facilitate lubrication thereof, these parts are mounted within a common housing 26, having a tongue extending along the bottom wall and fitting snugly in a keyway 27 of the saddle 17 so as to facilitate location of the power unit relative to the saddle. The housing 26 comprises an elongated tubular casting having an integrally formed rear wall 28 and closed at its forward end by a plate 29 which is detachably secured to the casting by suitable screws 30. To secure the housing detachably to the saddle 17, screws 31 (Fig. 4) extend upwardly through holes in the saddle. The gear box 19 may be similarly secured to the saddle by screws extending through holes 32 and to the plate 29 by screws extending through holes 33 in the edges of the plate which project beyond the sides of the casting 26.

Figure 1:
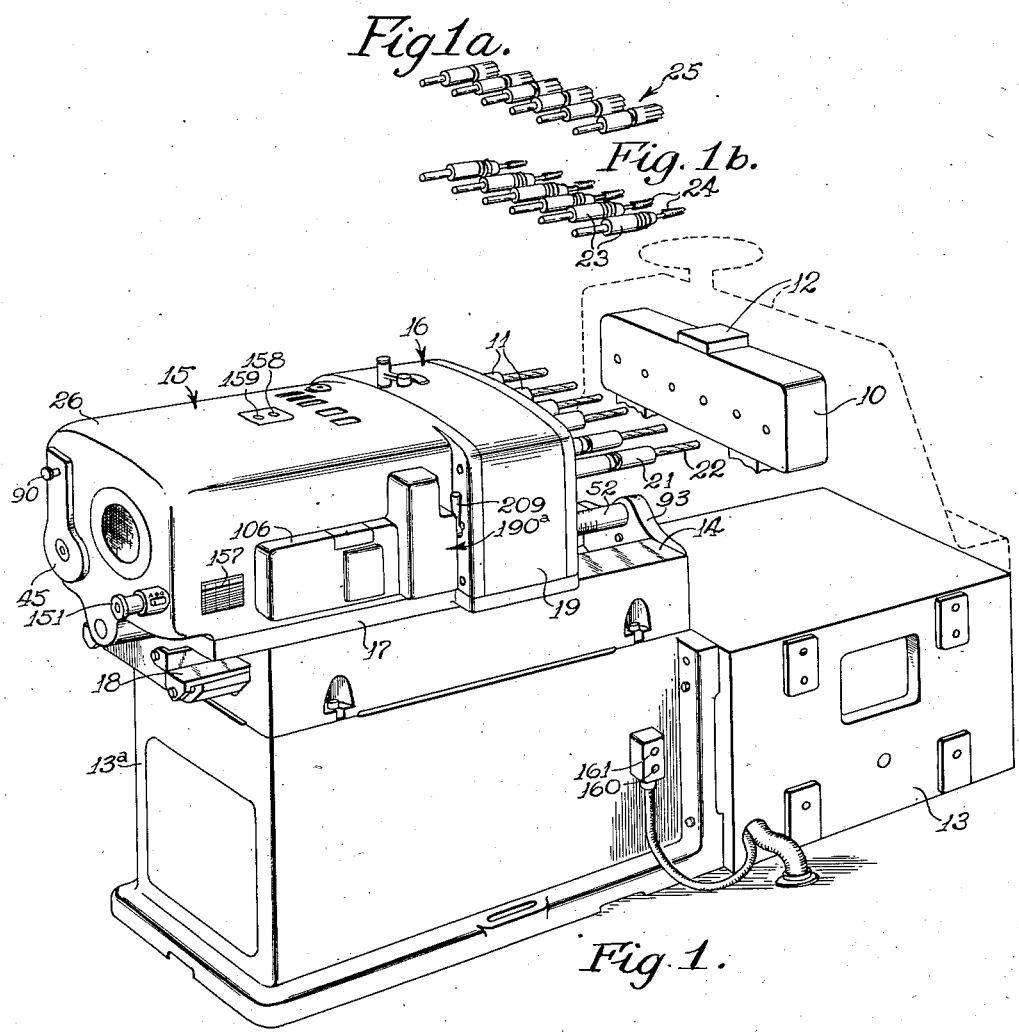

In the form of machine tool shown in Fig. 1, power for driving of the tool and for moving the tool at a slow cutting rate or at rapid traverse speed in both directions is derived from two electric motors 34 and 35 preferably disposed within the housing 26 near the end thereof opposite the tool unit 16. The motor 34 constitutes a combined tool-driving and feed motor and is made of the reversible type in order that tapping operations may be performed. The motor 35 is reversible and is arranged to produce rapid approach and rapid return motions according to the direction of its rotation when operated either simultaneously with or independently of the feed motor.

To support the feed motor 34, an internal partition wall 36 (Fig. 4) is cast integral with the housing 26 and annular flanges 37 are cast on this wall and the rear wall 28 in alinement with each other and with an opening in the rear wall. The field member of the motor is received in the cylindrical recess defined by the flanges 37 and the motor shaft 38 is supported at opposite ends in bearings respectively mounted in the wall 36.

and in a cap 39 received in and secured to the rear flange 37. A fan 40 on the rear end of the shaft induces the flow of air into a hole in a plate 41 closing the opening in the rear wall 28. The air passes through an annular passage around the motor housing and is discharged upwardly through openings 42 in the top wall of the power unit.

Figure 2:
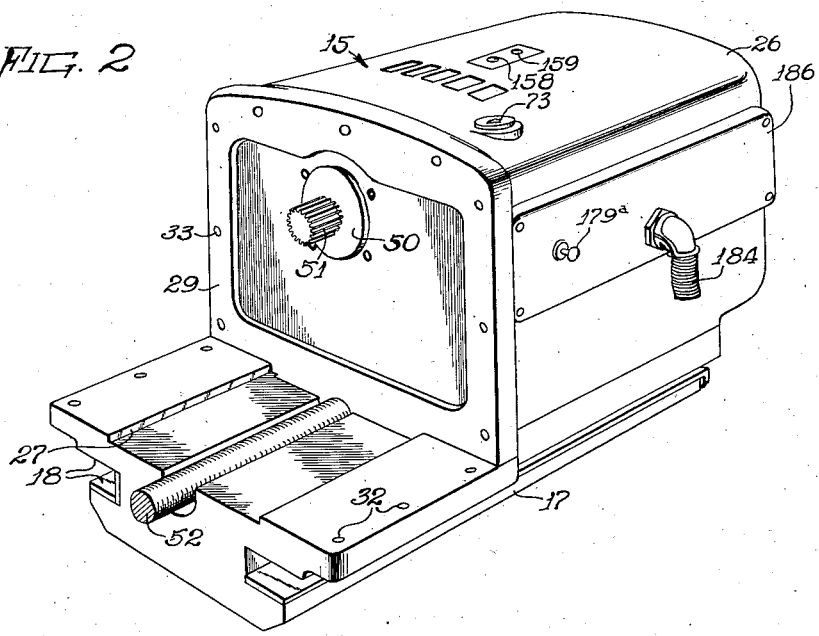
Fig. 2 is a fragmentary perspective view of that portion of the machine in which the power driving mechanism is incorporated.

The rapid traverse motor 35 is similarly mounted in a housing 43 (Fig. 7) formed in the lower part of the casting 26 in alinement with an opening 44 in the casing wall which opening is closed by a removable plate 45 (Fig. 2). The shaft 46 of the motor is journaled at its forward end in a bearing supported by the partition wall and at its rear end in a bearing mounted in a hollow casing 47 rigid with the cover plate 45 and slidably received in the rear end of the housing 43.

For extending the drive of the motor 34 into the spindle unit 16, the end of the motor shaft 38 which projects through the wall 36 carries a pinion 48 meshing with a gear on a shaft 49 which is journaled at one end in a bearing supported by the wall 36 and at the other end in a boss 50 on the front face of the plate 29. On its projecting end, the shaft 49 carries a pinion 51 providing one element of a disengageable coupling from which the gearing 20 of the tool unit is driven and which permits independent removal of either of the units 15 and 16 from the saddle 17.

Where, as in the embodiment selected for illustration, the cutting tool is moved relative to the work piece to be operated upon, the rotary motion produced by operation of the motors 34 and 35 either simultaneously or independently is converted into bodily rectilinear motion of the saddle 17 by two relatively rotatable feed elements which herein have constantly engaged driving connections with both of the motors so that a cycle of feed and rapid traverse motions in opposite directions may be defined by controlling the selective operation of the motors. The feed elements here employed comprise a screw 52 and a nut 53 threaded thereon. To permit both motors to be located within the housing and avoid the use of splined driving connections, the screw is stationarily anchored on the frame of the machine and a differential gearing 54 is employed to combine the motions of the two motors.

Herein the differential gearing (see Figs. 4, 5 and 9) is of the planetary type positioned with its axis disposed parallel to the motor shafts and having terminal sun and ring gears 55 and 56 connected respectively to the rapid traverse and feed motors and planet gears 57 carried by two plates 58 rigid with the feed nut 53. The sun gear is on a sleeve 59 loose on the nut and carrying a gear 60 which meshes with a gear 61 driven from the shaft 46 of the rapid traverse motor. Two sets of worm gears 62 and 63 connect the feed motor shaft 38 and the ring gear 56 with two cross-shafts 64 and 65 which are supported adjacent their ends by suitable bearings on the casting 26 with the outer ends of the shafts terminating in a recess 66 in one side wall of the housing 26 so that they may be exposed by removal of a cover plate 67 detachably secured to the housing. The shafts have splined ends constituting coupling elements by which the shafts may be connected by pick-off gears 68 or by various speed change units as will appear later. Flanges 69 on the cover plate 67 serve to hold the gears 68 in place on the shafts.

It will be observed that the nut 53 may be rotated by either of the motors 34 and 35 and will be advanced along the screw 52 in a direction and at a speed corresponding to that of the operating motor. In the event that the feed motor 34 is operated simultaneously with the rapid traverse motor, the rate of motion of the nut will be increased or decreased accordingly. To enable the saddle to be advanced by hand, a shaft 70 (Fig. 7) is mounted in the casing 26 for endwise movement to carry a bevel pinion 71 on the shaft into and out of engagement with a gear 72 on the shaft 46 of the rapid traverse motor. The shaft 70 terminates in a splined coupling element 73 exposed through the top wall of the casing 26 and is normally urged by a spring 74 out of driving engagement with the gear 72. By applying a hand crank to the coupling element 73 and releasing the rapid traverse motor brake in a manner to be described presently, the motor shaft 46 may be turned and the saddle 17 thereby moved conveniently inasmuch as the drive does not extend through gearing providing any substantial speed reduction.

When the feed motor alone is operating, the shaft 46 of the rapid traverse motor is held against rotation by a spring applied friction brake 74 arranged to be released by a solenoid 75 which is energized whenever the rapid traverse motor is excited. In the present instance, the brake and its actuator are mounted on the plate 45 to form a compact unit which may be removed readily to facilitate replacement of the friction surfaces or repair of the associated parts. To this end, the brake comprises a pair of friction disks 76 splined on the shaft 46 within the bearing casing 47 and adapted to be pressed between the end of the casing and a disk 77 by coiled compression springs 78 acting between the disk 77 and a plate 79. An annular flange 80 projecting axially from the plate 79 extends through and is supported by a flange 81 on the cover 45 and is adapted for axial adjustment by turning a bushing 82 which has inner and outer peripheral threads engaging threads in the cover 45 and on the flange 80. By changing the setting of the bushing 82, which it will be observed may be accomplished from a point exteriorly of the main housing, wear at the friction surfaces may be taken up and the braking action produced by the springs adjusted to the desired point. The flange 80 provides a slidable support for a projection 83 formed integral with the disk 77.

The solenoid 75 is mounted on the inner side of the cover 45 near the upper end thereof, and its armature 84 acts through the medium of a lever 85 to actuate the movable disk 77 of the brake. For this purpose, the upper end of the lever is pivotally connected to the armature and the lower end forms a yoke 86 which straddles the flange 81 and is pivoted at 87 thereon to define the lever fulcrum. An arm 88 on the lever projects into recesses in the flanges 80 and 81 and in the projection 83 and at a point slightly below the fulcrum 87 bears against a screw 89 threading into the projection. Thus, when the armature is shifted to the left as viewed in Fig. 7, the plate 77 is moved to the right releasing the brake. Manual release of the brake, in order to permit the saddle to be advanced by manual operation of the shaft 70, may be effected by pushing inwardly on a pin 90 which projects through the cover 45 and is adapted to engage the upper end of the lever 85. After adjustment of the brake by turning the bushing 82, the change in the position of the screw 89 may be compensated for by adjustment of the screw relative to the projection 83.

In the present instance, the differential gearing 54 and the nut 53 are disposed in the lower part of the main housing 26 preferably in a downwardly bulging portion 91 (Figs. 4, 5, and 7) thereof which projects into an upwardly opening recess in the saddle and constitutes a reservoir for fluid by which the gearing and associated parts are lubricated. The screw 52 projects from the forward end of the nut beneath the tool unit 16 and is secured as by a screw 92 to a plate 93 bolted to the forward ends of the ways 14 beyond the point to which the tool unit moves. The end portion of the screw projecting beyond the rear end of the nut is housed within a chamber which preferably is closed at its end to prevent foreign material from coming onto the screw threads.

The nut 53 is rotatably supported within the main housing 26 by anti-friction bearings 94 and oil seals 95 and 96 (Figs. 4 and 34) are provided for preventing leakage of lubricating fluid from the housing along the joints between the housing and the nut. Each seal comprises a flattened metal annulus 97 the outer peripheral edge portion of which bears against a ring 98 composed of oil-resisting rubber or other suitable material. The inner edge portion and a thin ring 99 of rubber or the like are secured to a ring 100 of bearing material. In the case of the seal 95, the outer ring is positioned in an annular seat 101 in the casting 26 and the ring 100 bears against the rear end of the nut 52, the axial relation of the seat and the end of the nut being such that the annulus 97 is bowed slightly causing the rings 98 and 100 to be pressed yieldingly against the nut and casting while permitting the nut to rotate freely. The seal 96 is mounted in the plate 29 and the ring 100 thereof bears against the inner raceway of the front bearing 94, the annulus 97 being properly bowed to provide the desired seal.

Preferably, the forward end of the nut 53 is exposed and formed with jaws 102 (Figs. 4 and 9) which constitute a coupling element for enabling the rotary motion of the nut to be transmitted to a remote point. Thus, for some machine tool applications, the main casing 26 would be stationarily mounted and utilized through suitable rotary driving connections with the nut 53 to impart motion to some element of the machine such as a work table which may be located in any position relative to the power unit. In such a case, the screw would be omitted and the shaft to be coupled to the jaws 102 would be extended through and suitably clamped in the nut.

Cycle controlling mechanism

Figure 3:
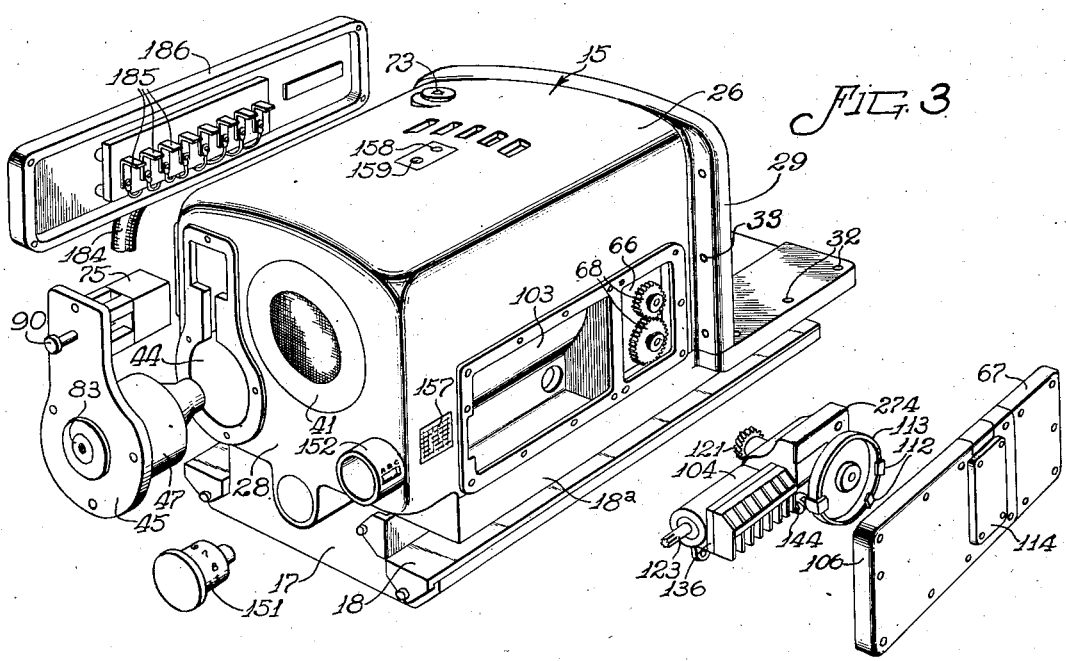
Fig. 3 is a perspective view of the power unit with the various sub-assemblies shown separated therefrom.

Incorporated in the power unit is a mechanism for controlling the selective operation of the motors 34 and 35 to define automatic cyclic movements of the spindle unit 16 or other machine element to which the motion of the nut 53 is communicated. To enable this mechanism to be removed readily from the power unit proper for the purpose of making repairs or changes in the cycles, it is formed as a structurally separate subassembly received in a recess 103 (Fig. 3) in one side of the main housing 26 and having all of its parts mounted on an elongated sub-frame member or casting 104 detachably secured to the main housing as by screws 105. The opening 103 may be closed by a removable cover 106.

In the present instance, the cycling mechanism comprises generally a series of switches 107, 108, 109, 110, and 111 governing the motor circuits and selectively operated by a series of adjustable dogs 112 on a timing element which is mounted on the power unit for movement relative thereto in timed relation to rotation of the nut 53. The dogs operate the control switches through the medium of a selector element which is advanced unidirectionally with a step-by-step motion through a plurality of different positions in which the switches are operated selectively to produce a combination of feed and rapid traverse motions in both directions.

Herein the timing element, which determines the points in the movement of the saddle at which different parts of a cycle are initiated and terminated, is in the form of a rotatable disk 113 positioned in the casing opening 103 so that it may be exposed for ready adjustment of the dogs 112 by removing a plate 114 on the cover 106. The dogs 112 project parallel to the axis of the disk 113 and are shaped to fit over a flange 115 to which they are clamped in adjusted position by screws 116. The disk is arranged to rotate with a shaft 117 journaled in one end of the sub-frame 104 and extending transversely of the motor shafts. Fast on the shaft is a gear 118 which meshes with a gear 119 on a shaft 120 connected by spiral gearing 121 to the rear end of the nut 53. It will be seen that the disk 113 will revolve relative to the power unit at a rate determined by the ratio of its drive gearing and in a direction and through a distance corresponding to the rotation of the nut.

In order that the position of the saddle 17 at which the cycle is started may be adjusted without changing the individual setting of all of the dogs 112, the disk 113 is arranged for angular adjustment independently of its supporting and driving mechanism. This is accomplished by mounting the disk 113 loose on the shaft 117 and clamping the same against the gear 118 by means of a nut 122. The nut is removable from the end of the shaft so that the disk with the dogs thereon may be detached readily if desired and another having a different arrangement of dogs substituted therefor thereby enabling the cycle to be varied by changing disks rather than by changing the individual settings of the dogs.

The selector element, which determines the character of the different parts of the cycle, comprises a cam shaft 123 extending parallel to the motor shafts and rotatably supported at one end of the frame 104 in bearing 124. Splined on the shaft to facilitate removal therefrom and provide for ready interchangeability are a plurality of sets of cams 125$^a$, 125$^b$, and 125$^c$, 126$^a$, 126$^b$, and 126$^c$, 127$^a$, 127$^b$, and 127$^c$, 128$^a$, 128$^b$, and 128$^c$, and 129$^a$, 129$^b$, and 129$^c$ which are separated by spacers 130 and clamped against a shoulder on the shaft by a nut 131 threading thereon. The corresponding cams of the different sets operate upon follower arms 132 which are pivoted at 133 on the sub-frame 104 and have extensions 134 which bear against pins 135 shiftable endwise in a panel 136 of insulation carrying the movable contacts of the switches 107 to 111. The stationary switch contacts are mounted on the panel 136. Compression springs 137 coiled around extensions of the pins 135 act to urge the movable contacts of the switches toward the stationary contacts. Herein the switches 109 and 110 are arranged in pairs with the movable contact of each pin operated by a single cam.

The cams for the different switches are formed with peripheral notches positioned and shaped as will be described later to define predetermined cycles of feed and rapid traverse motions. The cams are also shaped to permit shifting of the shaft endwise relative to its mounting, the followers 132 preferably being of sufficient width to overlie two adjacent cams in certain axial positions but each engaging only one cam in the normal operating positions. To further facilitate endwise shifting or removal of the cam shaft, the spacers 130 may, if desired, be of the same diameter as the outermost points on the cams.

A ratchet mechanism preferably of the mechanical type is employed for advancing the cycler shaft 123 one step each time one of the dogs 112 moves past a predetermined operating position. The mechanism shown includes a plunger 137ª (Figs. 12 and 14) mounted in the frame member 104 for endwise reciprocation in a recess which terminates adjacent an elongated ratchet wheel 138 rotatably supported at its opposite ends in antifriction bearings and splined on the adjacent end of the cam shaft 123. Pivoted at 139 on the plunger is a pawl 140 engageable at its free end with the ratchet teeth and urged toward the teeth by a compression spring 141 housed within the plunger and acting between a stationary plate 142 at the end of the plunger recess and an arm 143 on the pawl. The spring also serves to retract the pawl as permitted by engagement of a follower roller 144 on the outer end of the plunger with the flange 115 on the dog disk 113. The dogs 112 have inclined cam surfaces 145 which, as the dog moves into engagement and passes across the roller 144, presses the plunger inwardly during which movement of the pawl engages a ratchet tooth and advances the wheel 138.

Means is provided for completing the movements of the cam shaft with a quick snap action so that the control switches will be actuated with a minimum amount of arcing at their contacts and the different parts of the cycle will be sharply defined. Herein, this means comprises a second plunger 146 (Figs. 12 and 15) mounted in a recess in the member 104 adjacent the plunger 137ª and urged toward the ratchet wheel by a spring 147 acting between the plunger and an adjustable plug 148 closing the plunger recess. At its inner end, the plunger 146 has converging surfaces 148 and 149 which engage adjacent teeth on the ratchet wheel as shown in Fig. 15 to define definite angular positions of the cam shaft.

When the plunger 137ª is fully retracted against the flange 115 on the dog disk as shown in Fig. 14, the pawl 140 will engage behind one of the ratchet teeth and the plunger 146 will be engaging two teeth and acting to hold the cam shaft in a definite position (Fig. 15). Now as the plunger 137ª is cammed inwardly by the inclined surface 145 on one of the dogs 112, the pawl 140 starts to advance the ratchet wheel whereupon one of the ratchet teeth, acting on the surface 148 of the plunger 146, cams this plunger backwardly against the action of the spring 147. When the shaft has been advanced to a point where the ratchet tooth passes over center relative to the pointed end of the plunger 146, the energy stored in the spring 147 projects the plunger forwardly, the surface 149 thereon acting on the ratchet tooth to cam the shaft forwardly ahead of the pawl 140 with a quick snap action until the plunger again becomes seated between the next two ratchet teeth. The pawl thus continues its movement idly as the high point on the dog passes the roller 144. The cams on the shaft 123 are shaped so that the control switches are operated during the rapid portion of each cam shaft movement. It will be observed that by inclining opposite sides of the dogs 112, the cam shaft will be advanced through one step upon movement of the dog in either direction past the roller.

To enable the character of the motions of the operating cycle to be changed quickly and conveniently and independently of any movement either of the work or tool supports, the sets of cams on the shaft 123 are arranged so that different ones may be brought into operative association with the switch actuating followers 132 by shifting the cam shaft axially into different positions. For the purpose of such adjustment and to enable the cam shaft to be removed readily from the frame member 104 without disturbing the ratchet mechanism, the cam shaft has a spline connection with the ratchet wheel 138 and is adapted for endwise movement in the bearing 124. The latter is retained in the frame 104 by a threaded plug 150 which may be removed.

In the present instance, axial shifting of the cam shaft is effected manually preferably from a point exteriorly of the main housing 26. For this purpose, the end of the shaft opposite the ratchet wheel 138 has a spline connection with a shaft 151 (Figs. 1, 11, and 12) which projects through a hole in the rear wall 28 of the main housing and is supported for rotary and endwise movement in an outwardly projecting sleeve 152. The two shafts 123 and 151 may be joined by a set screw which may be loosened to permit independent removal of the shaft 151 when it becomes necessary to remove the cycle controlling unit from the housing. The shaft 123 may be held in selected position by means such as a screw 153 accessible through an opening in the closure plate 106 and threading into the frame 104 with its inner end entering one of several annular grooves 154ª to 154ᶜ (Fig. 12) in the shaft, the arrangement being such that the cam sets, a, b, and c will be associated with the switch followers when the screw is seated in the correspondingly lettered grooves.

In at least one angular position of the cam shaft, the cycle starting position in the present instance, the points on a group of cams associated with any one follower 132 are equidistant from the shaft axis so that the cam shaft may be shifted freely. To shift the shaft, it is first turned counter-clockwise to starting position by grasping a knurled handle on the outer end of the shaft 151. Then after retraction of the screw 153, the shaft is moved endwise to the desired position after which the screw is moved by grasping a knurled handle on the outer end of the shaft 151 projected inwardly to hold the shaft against accidental endwise movement while permitting freedom of rotary motion.

Means observable from a point exteriorly of the power unit is provided for indicating at all times the cycle for which the control mechanism is set and also the part of the cycle being executed. The shaft 151 is used as a convenient means of performing this function, and for this purpose numbers representing the different angular positions of the cam shaft are marked in a single row around the shaft and located in an axial position such that they register with an elongated slot 155 (Fig. 11) in the sleeve 152 in all of the different axial positions of the cam shaft. The width of the slot is such that only one of the numbers appears for each angular position of the cam shaft. The axial position of the cam shaft is determined by the position of the row of numbers with respect to a scale 156 (Fig. 11) of letters marked on the sleeve 152 along one side of the slot 155 and spaced to correspond to the different axial positions of the cam shaft.

Although the cam shaft may be adapted to define any desired number of different cycles according to the number of sets of cams mounted thereon, three sets are provided in the present instance, these being shaped to define a tapping cycle composed of rapid approach, forward feed, reverse feed, and rapid return motions, an ordinary drilling or milling cycle composed of rapid approach, feed, and rapid return motions, and a so-called jump feed cycle composed of repeated rapid traverse and feed motions followed by a single rapid return motion. These cycles are indicated respectively by the letters A, B, and C on the scale 156. The different parts of these cycles are marked in vertical rows on a plate 157 (Figs. 2 and 29) preferably attached to the outer surface of the main housing 26 adjacent the indicator. Assume for example, that it is desired to ascertain the character of the motion which will be executed when the cam shaft is in No. 3 position and set for the "B" or drilling cycle. In this position, the control switches would be conditioned for causing rapid return as indicated on the table 157 by the legend in the row headed "Cycle B" and opposite the numeral 3 in the left hand vertical column. It will thus be seen that by turning the shaft 151, the cam shaft 123 may be set manually to cause any desired part of a cycle to be executed.

Electric circuits

While the cam operated switches above described may be utilized in various different circuit arrangements, it is preferred, in order to provide for convenience and insure a high degree of safety in the control of the machine tool by the operator, to employ an arrangement such as is diagrammed in Fig. 25. In this diagram, the motors 34 and 35 are arranged to be started under manual control by momentary closure of a push-button switch 158 and continuation of the cycle is dependent upon a normally closed manually operable switch 159 which when opened interrupts the cycle which cannot thereafter be resumed except by closure of the switch 158. The switches 158 and 159 are conveniently located on the top wall of the casing 26, and there may be other sets of similar switches such as 160 and 161 located at any other desired point of control.

Referring now to Fig. 25, the rapid traverse motor 35, being of relatively small capacity, is arranged to be controlled directly by the two pairs of switches 109 and 110 while the switches 107 and 108 operate through the medium of magnetic relay switches 162 and 163 to control the feed motor 34. Energization of the coil 164 of the relay switch 162 closes switches which connect the power leads 165, 166, and 167 to conductors 168 which lead to the feed motor through coils 169 of a standard thermal cut-out or overload relay. Power is thus supplied to the feed motor to initiate operation of the latter in a direction to feed the tool head assembly forwardly. Similarly, energization of the coil 170 of the relay switch 163 connects the feed motor to the power leads in a manner such as to cause reverse rotation of the motor and retraction of the tool head away from the work.

The operating cycle is initiated by closure of any one of a plurality of energizing circuits for the magnetic coil 164. One of these, which is controlled by the normally open push-button switch 160, extends from the power lead 167 through the coil 172 of a magnetic relay 173, a conductor 171 having the switch 160 therein, to the power lead 166. When the relay coil 172 is thus energized, a switch 174 will be closed establishing an energizing circuit for the relay coil 164 extending from the power lead 167, a conductor 175, the coil 164, the switch 174, a conductor 176, the cam operated switch 108, the normally closed stop switch 159 of the power unit, a conductor 177 having therein a normally closed switch 178 of an overload relay 179, the switch 180 of the overload relay or circuit breaker 169, the normally closed stop switch 161 to the power lead 166. The relay coil 164 may also be energized directly by closure of the switch 158 which connects one terminal of the coil 164 to the conductor 176 through the medium of conductors 181 and 181ᵃ. The overload relay 179 may be reset by pressing inwardly on a push-button 179ᵃ (Fig. 2).

Upon energization of the relay 162 to start the feed motor, a switch 182 is closed connecting one terminal of the coil 164 to the conductor 176 thereby establishing a locking circuit which maintains the relay energized independently of the relay 173 or of the switch 158 until the cam operated switch 108, the overload switches, or one of the manually operated stop switches 159 or 161 is opened to interrupt the forward rotation of the feed motor 34. Since the locking circuit extends through the stop switches, continued operation of the motors in any cycle is dependent upon these switches being maintained closed. The energizing circuit for the coil 170 of the reverse relay switch 163 extends from the power lead 167 through the coil, a conductor 183, the cam operated switch 107 to the stop switch 159 and thus is in parallel with the circuit of the coil 164 so as to be responsive to the push-button switches 158 and 159.

In the exemplary circuit arrangement shown, the rapid traverse motion is obtained by simultaneous operation of the motors 34 and 35 so that power may be supplied to the motor 35 through the same relay switch which controls the feed motor. The circuit thus extends from the conductors 168, one of which leads directly to the motor. The others lead to the switches 109 and 110 which are connected to the motor 35 through the coils of the overload relay 179. The direction of operation of the motor is determined by which of the relay switches 162 and 163 is closed and also by which pair of the switches 109 and 110 is closed. The brake solenoid coil 75 may be connected directly across the terminals of the motor 35 so as to be energized whenever the rapid traverse motor is excited regardless of its direction of rotation.

The circuit arrangement above described is advantageous first, in that the number of magnetic relays and control switches and the complexity of the electrical equipment are reduced to a minimum. Secondly, the starting of a cycle requires only a momentary closure of the starting switch 159. Thirdly, interruption of the operation of the motors in any part of the cycle may be effected by opening of a single stop switch 159 and resumption of the cycle, after interruption thereof while the tool is moving forwardly, is dependent upon closure of the start switch 158. Fourthly, a wide variety of different combinations of feed and rapid traverse motions may be obtained with a minimum change in the construction of the automatic control mechanism. For example, a so-called jump feed cycle comprising any number of successive rapid traverse and feed motions may be obtained simply by providing for opening and closing of one of the rapid traverse motor control switches.

As shown in Fig. 25, the circuits are so arranged that the relays 162, 163, and 173 and the control switches 160 and 161 may be located at any desired point outside of the power unit. The conductors connecting the relays with the cam operated switches and the control switches 158 and 159 on the power unit extend through a flexible conduit 184 (Fig. 2) and terminate in contacts 185 mounted on a common plate of insulation mounted on a cover 186 for a recess in the side wall of the main housing 26 opposite the cycling mechanism. Within the housing are correspondingly spaced pairs of spring contacts 187 (Fig. 5) which are engaged by the respective contacts 185 when the cover is positioned on the housing. The electrical connections between the contacts 187 and the terminals of the control switches and motors are made within the housing 26.

*Operation in typical cycles*

For an ordinary tapping cycle as represented in Fig. 20, the circuit arrangement shown in Fig. 25 would be employed, the cams 125$^a$, 126$^a$, 127$^a$, and 128$^a$ would be constructed as shown in Fig. 21, the switch 109 being held open by the cam 127$^a$ throughout the cycle which occurs in the movement of the cam shaft 123 through four positions as indicated in Figs. 20 and 21, two complete cycles being executed in each revolution of the cam shaft. Dogs 112$^a$, 112$^b$, and 112$^c$ would be positioned on the disk 113 as shown in Fig. 20 and spaced to correspond to the lengths of the different tool motions to be effected. At the start of the cycle, the parts would be in the relative positions shown in Figs. 20 and 21, the switches 107 and 109 being held open by the cams 125$^a$ and 128$^a$, the switches 108 and 110 being closed, and the ratchet plunger 137$^a$ held in advanced position by engagement of its roller 144 and the dog 112$^a$.

To start the cycle, the switch 158 or the switch 160 is closed momentarily whereupon the relay coil 164 will be energized to close the switch 162 and initiate operation of the feed motor 34 in the forward direction. Since the switches 110 are then closed, the rapid traverse motor 35 will also be started to move the tool head forwardly at rapid traverse speed. After its initial energization, the relay coil 164 is maintained energized by the locking circuit through the stop switches 159 and 161. The cam shaft 123 remains stationary as the dog 112' moves away from the roller 144 and until the roller is engaged and the ratchet plunger 137$^a$ actuated by the dog 112$^b$ whereupon the cam shaft is advanced rapidly through an eighth of a revolution to its second position. In this movement, a lobe on the cam 128$^a$ opens the switches 110 whereupon the operation of the rapid traverse motor 35 is interrupted and the feed motor continues to operate to advance the tool head at feed speed and drive the tool to effect the tapping operation. After completion of the latter, the dog 112$^c$ actuates the ratchet plunger to advance the cam shaft through its second step during which the follower rides off a lobe on the cam 125$^a$ allowing the switch 107 to close and a lobe on the cam 126$^a$ opens the switch 108. The relay coil 164 is thus deenergized and the relay 170 energized thereby reversing the direction of rotation of the feed motor 34 and of the dog disk 113. The direction of rotation of the tool is thus reversed and the latter is withdrawn from the work at feed speed.

When the dog 112$^b$ again engages the roller 144 and actuates the ratchet plunger to advance the cam shaft 123 in its third step, the follower for the cam rides off from the lobe on the cam 128$^a$ allowing the switches 110 to close which again initiates operation of the rapid traverse motor 35. But since the feed motor 34 is now energized through the reverse relay switch 163, the rapid traverse motor runs in a direction reverse to its initial rotation thereby producing a rapid return motion. The cycle is terminated automatically upon the fourth movement of the cam shaft which is produced by the dog 112$^a$ and in which a lobe on the cam 125$^a$ opens the switch 107 to deenergize the relay 170, the switch 108 being allowed to close by the cam 126$^a$.

For drilling, milling, boring, and other machining cycles comprising successive rapid approach, feed and rapid return motions, a set of cams 125$^b$, 126$^b$, 127$^b$, and 128$^b$ constructed as shown in Fig. 19, would be used and the control dogs would be spaced according to the movements to be executed as shown in Fig. 18 and represented on the table 157 in Fig. 29. At the start of the cycle, the switches 108 and 110 would be closed and the switches 107 and 109 would be held open. When one of the starting switches 158 and 160 is closed, the relay coil 164 will be energized initiating operation of the feed motor in a forward direction and also starting the rapid traverse motor in a corresponding direction through the then closed switches 110. In the first advance of the cam shaft 123 which occurs when the dog 112$^b$ actuates the ratchet plunger, a lobe on the cam 128$^b$ opens the switches 110 thereby interrupting operation of the rapid traverse motor. The feed motor continues to operate to drive the tool and advance the same into the work piece during the cutting operation.

At the completion of the machining of the work piece, the dog 112$^c$ becomes effective to advance the cam shaft in its second step whereupon the follower controlling the switches 109 rides off from a lobe of the cam 127$^b$ allowing these switches to close causing rapid retraction of the tool out of the work. During the ensuing rapid return movement of the tool head, the dog 112$^b$ causes a third or idle advance of the cam shaft 123 without changing the condition of the control switches so that the return of the head continues until the cam shaft is moved to its fourth position by the dog 112$^a$. In this advance, the follower rides over a short lobe 188 on the cam 126$^b$ to open the switch 108 momentarily thereby interrupting the locking circuit for the relay coil 164 to stop the feed and rapid traverse motors but leaving the switch 108 closed and thus conditioned for initiation of the next cycle. In the same advance of the cam shaft, the cam 127$^b$ opens the switches 109 while the cam 128$^b$ allows the switches 110 to close.

Under certain conditions it may be desirable to provide a slightly greater delay in the interruption of the locking circuit than is produced by the cam lobe 188. To this end, the free end of the follower 132 for the cam 126 bears against a port 189 (Fig. 17) in the end of a piston 190 slidable in a cylinder 191 and urged outwardly against the follower by a spring 192. As the follower is moved by the cam lobe 188, the piston 190 moves outwardly filling the cylinder with air which, as the follower moves reversely under the action of the spring 137, is compressed within the cylinder but is allowed to leak out slowly through the valve formed by the follower and the piston. In this way, closure of the switch 108 is delayed slightly insuring proper opening of the locking circuit.

Figs. 23 and 24 show the arrangement of the cams and dogs which would be used for defining a so-called jump feed cycle which comprises a succession of alternate rapid traverse and feed motions followed by rapid return of the tool to starting position as shown on the table 157. This cycle is executed in the movement of the cam shaft 123 through eight rest positions and is initiated by closure of the start switch 158 with the parts positioned as shown in Figs. 23 and 24. This closes the energizing circuit for the relay coil 164 and the resulting closure of the switch 162 starts the feed motor 34 and also the rapid traverse motor 35 since the switches 110 are then closed by the cam 128ᶜ. The tool thus approaches the work rapidly until the dog 112ᵇ advances the cam shaft to its second position whereupon the switches 110 are opened to stop the rapid traverse motor. Operation of the feed motor continues until the dog 112ᶜ acts to advance the shaft causing the cam 128ᵃ to close the switch 110. The rapid traverse motor is then started and the tool advanced until the dog 112ᵈ moves the cam shaft to the fourth position in which the second feed motion occurs.

When the tool has operated upon all of the surfaces to be machined in the cycle, the dog 112ᵉ advances the shaft 123 through its fifth step during which the switch 109 is allowed to close by a lobe on the cam 127ᶜ thereby starting the rapid traverse motion to initiate rapid return of the tool. As the dogs 112ᵈ, 112ᶜ, and 112ᵇ move past the plunger roller 144, the cam shaft is advanced in its fifth, sixth and seventh steps without changing the condition of the control switches. Finally, when the dog 112ᵃ advances the cam shaft to its eighth position, the switch 108 is opened momentarily by a lobe 189 on the cam 126ᵉ terminating the cycle with the switches 109 opened and the switches 108 and 110 closed and thus conditioned for starting of the next cycle.

The cycles above described are typical of the many different ones which may be executed. It will be observed that by varying the number and spacing of the dogs 112 on the timing element, and changing the configurations of the selector cams which are in operative association with the followers, any desired combination of rapid traverse and feed motions or multiples thereof may be obtained with the individual motions of any desired length.

Quick change of feed rate

Under certain conditions of service use, it is necessary that the speed of rotation of the nut 53 or the rate of feed of the power unit be changed quickly either automatically or by manual operation and in fixed or selectively variable increments. To meet these conditions without necessitating a special construction of the power unit as a whole, the invention contemplates the attachment to the power unit of any one of a plurality of different separately formed speed change units which may be substituted bodily for the pick-off gears 68 and utilized to form a driving connection between the cross shafts 64 and 65.

Figs. 1 and 31 show a speed change unit 190ᵃ of the above character adapted to effect a fixed variation of the rate of feed. This unit includes a casing 191ᵃ adapted to fit over the opening 66 in the main housing 26 and to be secured thereto by screws 192ᵃ the same as the cover plate 67. Within the casing are driving and driven shafts 193 and 194 having their outer ends supported in bearings 195 and their inner ends recessed and splined to couple to the shafts 64 and 65. The shaft 193 and 194 are spaced to correspond to the spacing of the shafts 64 and 65 and mounted on the casing 191 so that the ends of the latter shafts will be alined with and become coupled to the former shafts when the casing is mounted on the power unit.

Fast on the shaft 193 are two gears 196 and 197 of different sizes meshing respectively with gears 198 and 199 loose on the shaft 194 and having coupling jaws 200 formed thereon for engagement with complemental jaws at opposite ends of a collar 201 which is splined on the intermediate portion of the shaft 194 and shiftable axially to couple one or the other of the gears 198 and 199 to the shaft. Thus when the collar is shifted to the right, motion is transmitted from the driving shaft 64 to the shaft 65 through the gears 196 and 198. In the left hand position shown in Fig. 31, the drive is through the gears 197 and 199. By properly proportioning the gears, any two different drive ratios may be obtained.

The collar 201 may be shifted manually or automatically by any suitable means. Herein the collar is connected within the casing to one end of a lever 202 fulcrumed at 203 and connected at its other end by a crank pin on a gear 204 arranged to be turned by reciprocation of a rack 205 which is urged by a spring 206 into a position to produce the high speed drive ratio. The rack is connected to the armature of a solenoid 208 which, when energized, shifts the rack and the lever 202 into the position shown in Fig. 31 thereby producing the low speed ratio. If it is desired to change the drive ratio manually, the shaft carrying the pinion 204 may be extended through the casing 191ᵃ has equipped with a handle 209 (Fig. 1) for shifting the collar 201.

In some applications, it is desirable, in order to obtain optimum efficiency, to change the rate of feed of the tools automatically in the course of the machine cycle. This may be accomplished simply and conveniently by equipping the power unit with a speed-change mechanism of the type shown in Fig. 31 constructed to produce the feed rates desired and utilizing the cam shaft 123 of the cycling mechanism as a means of controlling the energization of the solenoid 208. Assume for example that a jump feed cycle as represented in Fig. 23 is to be used and that the tool is to be fed at a relatively high rate during the first feed motion and at a slower rate during the second feed motion. In such a case, the switch 111 would be arranged as shown in Fig. 25 in the circuit of the solenoid coil 208 and a cam 129 would be shaped as shown in Fig. 23 to close the switch in the third step of the cam shaft movement and open the switch in the fourth step. By forming the cam 129ᶜ with an additional keyway as shown in Fig. 23, the cam may be mounted on the cam shaft 123 in a position such that the solenoid 208 will be energized in the first step of the cam shaft movement, thereby causing the fast feed to occur in the second part of the cycle.

For applications requiring a quickly adjustable or widely variable feed rate, a unit 210 of the character shown in Figs. 6 and 10 is mountable on the power unit proper interchangeably with the pick-off gears 68 and the gear unit 190ª and is utilized to form the driving connection between the shafts 64 and 65. This unit includes a casing 211 adapted to be attached to the main housing 26 in place of the cover plate 67 and providing spaced bearings for opposite ends of a drive shaft 212 and a driven shaft 213 the inner ends of which are recessed and spaced to receive and be coupled to the splined ends of the shafts 64 and 65 respectively.

Intermediate its ends, the shaft 212 has a section 214 of non-circular cross-section extending at an angle to the axis of rotation of the shaft through a correspondingly shaped recess in an eccentric cam 215. The latter is held by suitable abutments against axial movement and is rotatable in one end of a yoke 216 mounted in the casing for endwise reciprocation. The arms of the yoke straddle the driven shaft 213 and have their ends respectively connected by pivotal joints 217 to two rings 218. These rings constitute the driving members of two over-running clutches 219 and 220 the driven members of which are fast on the shaft 213.

The clutches act in the same direction but by virtue of the reverse movement of the rings 218 in each stroke of the yoke, one clutch operates to advance the shaft 213 during the down stroke of the yoke while the other clutch advances the shaft on the up stroke. Thus as the eccentric rotates, the shaft 213 is advanced progressively in one direction with an intermittent but nevertheless substantially continuous motion. By shifting the shaft 212 axially to move the shaft portion 214 relative to the eccentric, it will be apparent that the throw of the eccentric and therefore the speed of the driven shaft 213 may be varied progressively from a maximum to zero at which the axes of the eccentric and the shaft 212 coincide and no motion of the yoke occurs.

Adjustment of the eccentric is effected by shifting the shaft 212 axially through the medium of a rod 221 coupled to the outer end of the shaft 212 for axial movement therewith but held against rotation relative thereto. The rod may be shifted by movement of a lever 222 connected intermediate its ends to a collar 223 urged by a spring 224 against an adjustable stop nut 225 threaded onto the rod. In the present instance, the lever is arranged to be shifted against the action of the spring by energization of a solenoid 226 mounted within the casing 211 and having an armature connected to the free end of the lever. When the solenoid is energized, the shaft 212 would be shifted inwardly producing the maximum throw of the eccentric as determined by the position of the stop 225. Upon deenergization of the solenoid, the spring 224 moves the shaft 212 outwardly to the position determined by the setting of an adjustable stop 227 as shown in Fig. 6. By properly setting the stops 225 and 227, the limit feed rates may be varied as desired. If desired, the unit lever 222 may be set to produce any other desired rate of feed by turning the nut 225 to the proper position axially of the threaded rod 221.

*Production of feed motions by separate motor*

In some machine tool applications, particularly milling, it is desirable that the cutter operate unidirectionally in both directions of bodily movement of the tool. For such applications, the invention contemplates the use of the motor 34 as a means of driving the tools and the provision of a separate electric motor 228 (Fig. 30) for imparting the feed motions to the nut 53. Preferably the motor 228 and its drive gearing constitute a separate unitary structure which may be attached to the side wall of the power unit proper and substituted interchangeably for the pick-off gears 68 in the same manner as the speed change units 190 and 210.

Referring now to Figs. 26, 30, and 32, the parts of the motor unit are mounted within two structurally separate casings 229 and 230, the former housing the necessary speed reduction gearing and being adapted for attachment to the main housing over the pick-off gear opening by screws. The casing 230 is bolted to the upper wall of the casing 229 (see Fig. 32) and projects upwardly along the side of the main housing 26. The motor 228 and the electrical control equipment associated therewith are housed within the upper end portion of the casing 230 and its shaft which is supported in suitable bearings, carries a pinion 231 meshing with a gear on a vertical shaft 232 the lower end of which is connected by bevel gearing 233 with a spur gear 234 fast on a cross shaft 235 at the lower end of the casing.

The lower part of the gear 234 projects through an opening in the upper end of the casing 229 and meshes with a gear 236 fast on a shaft 237 which is journaled intermediate its ends in bearings 238 and alined with the shaft 64. Splined on the outer end of the shaft 237 is a pick-off gear 239 meshing with a pick-off gear 240 splined on the outer end of a shaft 241 which is suitably supported and formed at its inner end with a splined recess for receiving the splined end of the shaft 65. A spacer bushing 242 may be mounted on the splined end of the shaft 64 to maintain the axial position of the shaft 237.

With this arrangement, it will be observed that the shaft 237 is disconnected from the shaft 64 and that the drive to the shaft 65 is from the motor 228 through the speed reduction gears 231, 233, 236, 239, and 240. The gears 239 and 240, being splined on the shafts 237 and 241, may be removed and other gears substituted therefore if it is desired to change the drive ratio. To permit of this, the wall of the casing 229 opposite the main housing is formed as a separate plate 229ª of the same construction as the cover plate 67 and detachably secured to the casing proper by screws 243.

When an auxiliary feed motor 228 is used, the circuit and cam arrangements shown in Figs. 22 and 26 are employed, the switch 108 being used to control the relay 62 by which current is applied to drive and rapid traverse motors. Operation of the feed motor 228 in opposite directions is governed by two relays 245 and 246 the energizing circuits for which extend through the switches 107 and 111 and include the stop switch 159. For the execution of a cycle of rapid approach, feed, reverse feed, and rapid return motions, the cams 125 to 128 would be shaped as shown in Fig. 22 and the dogs 112 would be arranged as shown in Fig. 20. Upon closure of the switch 158, the relays 62 and 246 would be energized to start all three of the motors. At the completion of the rapid approach, the motor 34 would be stopped by opening of the switches 110 and the tool would be fed forwardly by the motor 228 until its direction of rotation is reversed by opening of the switch 111 and closing of the switch 107. At the end of the reverse feed, rapid return would be initiated by closure of the switches 109, the cycle being terminated by momentary opening of the switch 108, opening of the switches 109 and 107, and closure of the switches 110 and 111.

Preferably, the relays 245 and 246 are housed within the casing 230 and the circuit connections to these relays and the motor 228 extending from the main casing 26 through a conduit 247 (Figs. 32 and 33) detachably joined to the housing 26. The conductors leading to the motor have disengageable connector contacts 247ᵃ permitting ready detachment and removal of the third motor unit.

The gear unit within the casing 229 may also be used without the motor 228 for connecting the shafts 64 and 65 and effecting a substantially greater reduction in speed than may be obtained by the pick-off gears 68. For this purpose, the motor 228 is disconnected from the gears within the casing 229 and a gear 248 shown in dotted outline in Fig. 30 and mounted on the shaft 64 in mesh with a gear 249 which is loose on the shaft 241 and rigid with a pinion 250 which in turn meshes with the gear 236. In such a case, the gear 249 constitutes the driving element of the speed reduction unit and is mounted to turn on the same axis as the driven shaft 241 so that the drive from the shaft 64 to the shaft 65 would be through gears 248, 249, 250, 236, 239, and 240.

If it is desired to provide a greater reduction than is obtainable with the gears within the casing 229, the cover plate 229ᵃ may be removed and a second casing having gears constructed similar to those within the casing 229 would be employed. For this purpose, the gear 239 of the first unit would be in mesh with the gear 249 of the second unit. Or a speed change unit 190ᵃ (Fig. 31) may be mounted on the casing where it is necessary to provide for quickly changing the rate of feed by the motor 228. In such a case, the cover plate 229ᵃ and the gears 239 and 240 would be removed and the casing 191 of the unit 190 bolted to the casing 229 with the spline ends of the shafts 237 and 240 coupled to the shafts 193 and 194 respectively.

From the foregoing, it will be observed that the gear units 190ᵃ, 210, the third motor power unit, and the gearing within the casing 229 constitute separate sub-assemblies which are interchangeable with each other and each may be mounted on the power unit housing and is interchangeable with the pick-off gears 68. Moreover, the gear units may be joined together to effect any speed reduction that may be desired. In this way, the power unit proper may be made of a standard construction for a wide variety of metal-removing processes and readily adapted for effecting the feed motions required for a specific process simply by associating therewith the proper gear units. A wide range of versatility is thus obtained through the use of a comparatively small number of simple parts such as gears.

Speed change of tool drive

To render the present machine tool readily adaptable to different types of operations, means is provided for enabling the speed of relative rotation between the tool and the work to be changed quickly and conveniently without change in the construction of the power unit as a whole. This means would ordinarily be designed especially for a given application and therefore is preferably incorporated in the gear box 19. While it may comprise pick-off gears changeable without removal of the tool unit from the saddle, the means herein shown is in the form of a separate speed change gear unit 252 disposed within the gear box and operable manually from a point exteriorly thereof.

In the form shown in Fig. 27, the movable parts of the gear unit 252 are supported by a member 253 detachably secured to the boss 59 on the front plate 29 of the power unit 15. Mounted in a bearing on the member 253 is a shaft 254 having an end recess splined to receive the gear 51 and carrying two gears 255 and 256 of different diameters meshing with gears 257 and 258 which are loose on a shaft 259. The latter is supported at opposite ends in anti-friction bearings and at its forward end carries a pinion 260 meshing with a gear on the speed reduction unit 20 leading to the spindles 11.

The gears 257 and 258 are shiftable together axially of the shaft 259 between two positions in one of which a row of internal teeth on the gear 258 are in mesh with a row 261 of gear teeth on the shaft 259 to establish a driving connection between the shafts 254 and 259 through the gears 256 and 258. In the other posititon, internal teeth 261ᵃ on the gear 257 mesh with the teeth 261ᵇ on the shaft 259, the drive being through the gears 254 and 257 thereby providing greater reduction in the spindle speed.

To effect shifting of the gears 257 and 258, a block 63 (Fig. 28) slidably mounted on the gear case 253 engages the gears and is engaged by a crank pin 264 on a shaft 265. The latter projects through the gear box 19 and may be shifted to change from one speed ratio to the other by swinging a crank 266.

Variations of the cycle length

Under certain conditions, it becomes desirable to change quickly and substantially the length of the cycle capable of being executed. This may be accomplished by changing the drive ratio between the nut 53 and the dog disk 113. To this end, the shaft 117 is made of greater length and the gear 118 is carried by a sleeve 267 (Fig. 40) clamped between the disk 113 and the shaft. When it is desired to adapt the control mechanism for a substantially longer stroke, the sleeve 267 is removed and replaced by a loose sleeve 268 (Fig. 41) having a gear 269 thereon meshing with the gear 119 and a second smaller gear 270 which meshes with a gear 271 on the extended end of the shaft 120. Rigid with the gear 271 is a pinion 272 which meshes with a gear 273 clamped between the disk 113 and a shoulder on the shaft 117. By changing the relative sizes of the three sets of gears, the disk 113 may be driven at any desired rate relative to the nut 53 and this drive ratio may be varied quickly and conveniently.

Quick convertibility of the machine

The machine tool above described lends itself readily to quick conversion from a machine for performing one operation such for example as drilling to one for effecting a different operation such as tapping, both operations being carried on at maximum efficiency. If the machine shown in Fig. 1 is to be used for drilling a series of holes in the work piece 10 and also for tapping these holes, the drill chucks 21 and the tap collets 23 would be arranged for mounting interchangeably on the spindles 11 and the machine would be equipped with a control mechanism having sets of cams 125 to 128 constructed and arranged as above described and shown in Figs. 19 and 21 and with dogs 112 arranged on the disk 113 in accordance with the depth of the holes. To provide the necessarily slower feed rate and spindle speed for tapping, speed change units such as the units 198 and 252 (Figs. 27 and 31) above described would be interposed in the driving connections of the feed motor 34 which extend to the feed nut 53 and the spindles 11 in the tool unit so that by shifting the handles 209 (Fig. 1) and 266, the proper drive ratios for drilling and tapping could be obtained. For tapping applications, the rate of feed would of course be correlated with the lead of the feed screw 52 and that of the tapping tools so that in the rotation of the nut 53 at the established speed, the tool support would always follow the tap closely, slight variations in the relative positions being allowed by virtue of the yieldable mounting of the taps in the collets 23. Proper synchronism between the rotation and advance of the taps results from the use of a single motor for producing both of these motions while the tap is in operative engagement with the work.

When the machine thus constructed is to be used for drilling the work piece, the drilling tools would be mounted on the spindles, the hand levers 209 and 266 would be positioned for rotating the spindles at the higher speed for feeding the head at the lower speed, and the cycle selector shaft 123 would be positioned axially for the execution of the drilling cycle B, the cams 125<sup>b</sup>, 126<sup>b</sup>, 127<sup>b</sup>, and 128<sup>b</sup> being then in operative association with the switch actuators. After drilling a batch of work pieces, the machine may be conditioned for tapping simply by substituting the tap collets 23 for the drill chucks, shifting the hand levers 209 and 266 to give the relatively lower rate of tool rotation and higher feed rate as is permissible in tapping operations owing to the small amount of metal to be removed, and shifting the cam shaft 123 axially to render the cams 125<sup>a</sup>, 126<sup>a</sup>, 127<sup>a</sup>, and 128<sup>a</sup> operative. For most drilling and tapping applications it would not be necessary to change the relation of the dogs 112 although this might be necessary in some instances. Of course, the length of the feed motion might also be changed by substitution of one dog disk 113 for another. While several changes are required to thus convert from one type of machine to another, all of these are of simple character and may be made quickly and conveniently. If desired, all of these changes could be effected from a common point of control through the use of solenoid operated gear units having their control switches associated with the cam shaft and operated selectively according to the axial position of the latter.

Lubrication of slideways

The invention also contemplates the provision in the power unit 15 of mechanism for effecting automatic distribution of lubricating fluid to different parts of the machine such as the screw 52 and the slideways for the saddle 17, the amount of lubricant delivered preferably being governed by the character or length of the operating cycle. Herein, the lubricant is contained in a reservoir formed by a casing 274 (Figs. 12, 35, and 36) surrounding the pawl and ratchet drive mechanism by which the cam shaft 123 is advanced. Mounted within the casing is a pump 275 preferably of the reciprocatory piston type having its intake disposed below the level of the lubricant regardless of the position of the power unit. The pump outlet is connected to a pipe 276 which communicates with a passageway 277 (Figs. 5, 12, and 37) formed in the casting 26 and extending parallel to the screw 52. Branching from opposite ends of this passage are two passages 278 (Figs. 4 and 37) formed in the casting 26 and the plate 29 and communicating with bleeder valves 279 arranged to discharge lubricant downwardly onto the screw 52 beyond opposite ends of the nut 53. A third passage 280 communicating with the passage 277 extends transversely of the casting 26 and communicates with bleeder valves 281 (Figs. 5 and 37) threading into the bottom wall of the casting 26 in positions to register with passages 282 when the power unit is secured in place upon the saddle 17. The passages 282 extend through the flanges 18<sup>a</sup> of the saddle and terminate in a groove 283 formed in each flange 18<sup>a</sup> and extending around all three surfaces of the slideways 14.

It will be seen from the foregoing that with the passage 277 filled with oil, the screw 52 and the slideways 14 will be lubricated effectually throughout their lengths as the saddle moves back and forth. The proportion of the lubricant distributed to the different parts may be varied as desired by regulating the relative sizes of the openings in the valves 279 and 281.

To coordinate the operation of the pump with the cycles executed by the tool, the mechanism by which the cycles are defined may be utilized as a means for governing the actuation of the pump. In the form shown in Figs. 12, 35, and 36, the piston rod 284 of the pump is moved through the discharge stroke by a spring 285 and the intake stroke is produced by teeth 286 on the ratchet wheel 138 acting as cams on one arm of a bell crank 287 pivoted at 288, the other arm of the bell crank bearing against a shoulder on the piston rod. Any number of the teeth 286 may be employed, it being apparent that each time the cam shaft 123 is advanced as above described with one of the teeth 286 engaging the bell crank, the piston rod will be retracted quickly through its intake stroke and released to the action of the spring 285. Then as the piston moves, lubricant will be discharged from the pump into the distributing system.

If desired, the pump may be actuated directly from the cam shaft 123 as shown in Figs. 38 and 39. To this end, a special cam 289 may be mounted on the cam shaft and arranged to operate on the bell crank 287. The cam may have any desired number of teeth for causing a corresponding number of strokes of the pump during a machine tool cycle. Since the cam may be removed and replaced readily, cams with different numbers of teeth may be used and the lubricating mechanism thus adapted to any machine tool cycle.

I claim as my invention:

1. An automatic machine tool having, in combination, a support mounted for reciprocation along a slideway, a gear box on said support, a spindle rotatably supported by said gear box and adapted for connection interchangeably with tools for performing different metal-removing processes, feeding mechanism for effecting movement of said support along said slideway, a reversible electric motor mounted on said support, means on said support providing a rotary driving connection between said motor and said feed mechanism including adjustable speed-change gearing operable selectively to cause feeding movement of said support at different predetermined speeds corresponding to the character of the respective tools, means for extending the drive of said motor to said spindle comprising speed-reduction mechanism within said box including speed change gearing selectively adjustable to cause rotation of the spindle at different speeds for the respective tools, a rapid traverse motor having a driving connection with said feed mechanism, and mechanism controlling the operation of said motors to define automatic cycles of movement of said support including a member manually shiftable into either of two positions in one of which said control mechanism defines a cycle of rapid approach, feed, and rapid return movements of said support and in the other of which a cycle of rapid approach, feed, reverse feed, and rapid return motions is executed.

2. A quick convertible automatic machine tool comprising, in combination, a frame structure, a tool support mounted on said frame structure for movement relative to a work piece, a plurality of spindles rotatably mounted on said support in a predetermined spaced relation and each arranged for connection interchangeably with tools for performing one of two different metal-removing processes on the same portion of the work piece, electric motor driving means for rotating said spindles and advancing the support at feed and rapid traverse rates including selectively changeable speed-change means by which the rates of spindle rotation and feed of said support may be changed readily and in predetermined ratios, and mechanism initially controllable by hand and responsive to the movements of said support for controlling the operation of said driving means to define different automatic cycles composed of combinations of feed and rapid traverse motions of said support including means by which said mechanism may be conditioned selectively for the execution of any one of said cycles whereby the machine tool as a whole may be converted quickly from a machine for performing one of said processes to a machine for performing another process on the same portions of said work piece.

3. A quick convertible automatic machine tool comprising, in combination, a frame structure, a tool support mounted on said frame structure for movement relative to a work piece to be machined, a spindle rotatably mounted on said support and arranged for connection interchangeably with tools for performing different metal-removing processes, cooperating feed elements mounted for relative rotation to move said support positively relative to said work piece, a combined drive and feed motor having rotary driving connections with said spindle and with one of said feed elements for driving said spindle and advancing the same bodily in synchronized relation, said driving connections having selectively operable speed change means interposed therein for enabling the rates of rotation and feed of said spindle to be adjusted quickly to correspond to the permissible rates of drive and feed for the different tools, a second motor having a driving connection with one of said feed elements and operable to advance said support in opposite directions at rapid traverse speed, and mechanism responsive to the movements of said support for controlling the operation of said motors to define different combinations of feed and rapid traverse motions including selectively operable means for quickly adjusting the mechanism for the performance of different cycles with the different tools.

4. A quick convertible automatic machine tool comprising, in combination, a frame structure, a tool support mounted on said frame structure for movement relative to a work piece, a spindle rotatably mounted on said support and arranged to support interchangeably tools for performing different metal-removing processes, power means for rotating said spindle and advancing said support at feed and rapid traverse rates including selector means by which the rates of rotation and feed may be adjusted in predetermined ratios for the efficient performance of any one of said processes, mechanism responsive to the movements of said support for controlling the operation of said driving means to automatically define different cycles each composed of combinations of feed and rapid traverse motions of said support including selector means by which said mechanism may be conditioned for the execution of any one of said cycles, said mechanism being controllable manually to initiate the successive cycles for which it is conditioned.

5. An automatic machine tool having, in combination, a frame structure having work and tool supports mounted thereon and a unitary self-contained mechanism for effecting relative rotary motion between the tool and the work and relative reciprocatory motion at feed and rapid traverse speeds between said supports comprising a hollow casing supported from said frame structure, feed and rapid traverse motors, means housed within said casing for combining the drive of said motors and extending the same through said casing to move one of said supports at rapid traverse rate or at a slow cutting speed during engagement of the tool and work including means adjustable from a point exteriorly of said casing to vary the cutting speed, switching means within said casing controlling the operation of said motors, means responsive to the feed and rapid traverse motions and controlling said switching means selectively to define different combinations of such motions, means adjustable manually from the exterior of said casing to condition said last mentioned means selectively for defining any one of said combinations of motions, and means adjustable from the exterior of said casing by which the relative lengths of said motions may be varied.

6. An automatic machine tool having, in combination, a frame structure having work and tool supports mounted thereon for relative rotational and reciprocatory movements and mechanism for effecting relative movement between said supports in predetermined automatic cycles comprising a hollow casing supported from said frame structure, feed and rapid traverse motors, means housed within said casing for combining the drive of said motors and extending the same through said casing to move one of said supports at rapid traverse speed or at a slow cutting speed during engagement of the tool and work, switching means within said casing controlling the operation of said motors, means responsive to the feed and rapid traverse motions for controlling said switching means selectively to define different combinations of such motions, means changeable manually from the exterior of said casing to condition said last mentioned means selectively for defining any one of said combinations of motions, and selectively adjustable means by which the relative lengths of said motions may be varied.

7. An automatic machine tool having, in combination, a support for a tool, a support for a work piece, one of said supports being movable along slideways, feed mechanism for actuating said movable support, two separate electric motors connected to said mechanism and operable selectively to advance the movable support in either direction either at a slow cutting speed or a rapid traverse speed, switching means governing the operation of said motors, control means responsive to the movements of said support and operable to actuate said switching means to define an automatic cycle of rapid approach, feed, and rapid return movements of said movable support, control means responsive to the movements of said movable support and operable to actuate said switching means to define a cycle of rapid approach, feed, reverse feed, and rapid return movements of said movable support, means for initiating operation of one of said motors independently of said control means whereby to initiate one of said cycles, and a manually operable member shiftable into either of said positions selectively to render one or the other of said control means effectual.

8. An automatic machine tool having, in combination, a machine element mounted for reciprocatory movement, feed mechanism including a rotary member, reversible electric motor driving means connected to said member and selectively operable to produce motion of said element at a slow cutting speed during engagement of a tool with the work and at rapid traverse speed, means for controlling the operation of said driving means, cam means operable to govern the selective operation of said control means to cause a cycle of rapid approach, feed, reverse feed, and rapid return motions to be executed by said element, cam means governing said control means to define a cycle of rapid approach, feed and rapid return movements, cam means governing said control means to define a cycle comprising a succession of alternate rapid approach and feed motions followed by a rapid return return motion, a common means responsive to the movements of said element to actuate said cam means, and manually operable means for placing said cam means one at a time in effective control of said control means.

9. An automatic machine tool having, in combination, a machine element mounted for reciprocatory movement, feed mechanism including a rotary member, reversible electric motor driving means connected to said member and selectively operable to produce motion of said element at a slow cutting speed and at rapid traverse speed, means for controlling the operation of said driving means, a rotary element arranged to be advanced with a step-by-step unidirectional movement during the movement of said machine element back and forth, cams arranged on said rotary element in a plurality of sets each set being operative in the rotation of the element to define a predetermined combination of rapid approach, feed, and rapid return motions, and manually operable means by which said sets of cams may be rendered operative one at a time.

10. An automatic machine tool having, in combination, a support for a tool, a support for a work piece, one of said supports being movable along slideways, feed mechanism for actuating said movable support, electric motor driving means connected to said mechanism and operable selectively to advance the movable support in either direction either at a slow cutting speed or a rapid traverse speed, switching means controlling the operation of said motors, a rotary control element mounted for angular movement and arranged to be shifted manually into a plurality of different axial positions, means responsive to the relative motion between said supports to advance said element angularly when in any one of said positions, means operable in the angular advance of said element when in one of said positions to actuate said switching means and define a predetermined cycle of feed and rapid traverse motions of said movable support, and means operable in the advance of the element when in said other position to actuate said switching means and define a different cycle of such motions.

11. An automatic machine tool having, in combination, a support for a tool, a work support, a frame structure on which said supports are mounted for relative movement, means for producing such movement in opposite directions at a slow cutting speed during engagement of a tool with the work piece to be machined or at a rapid traverse speed including electric motor driving means, mechanism responsive to the relative movements between said supports and controlling the operation of said driving means to define automatically any one of a plurality of different cycles each comprising a combination of rapid approach, feed, and rapid return motions, and means operable manually and independently of movement of either of said supports for selectively conditioning said mechanism for defining any selected one of said cycles.

12. An automatic machine tool having, in combination, a machine element movable back and forth to effect relative movement between a tool and work piece, power driven means for moving said element at rapid traverse speed in opposite directions or at a slow cutting speed during operative engagement of the tool and work piece, means controlling the operations of said power driven means to define different predetermined combinations of feed and rapid traverse motions including selectively adjustable means for conditioning the control means for the execution of any one of said combinations, and means operable in response to the movements of said element for determining the relative lengths of said motions in the selected cycle and changeable selectively independently of said first mentioned adjusting means to adjust the relative lengths of said motions.

13. An automatic machine tool having, in combination, a support for a tool, a support for a work piece, one of said supports being movable along slideways, feed mechanism for actuating said movable support, power driving mechanism for actuating said feeding mechanism to produce relative motion between said supports in either direction at a slow cutting speed or at a rapid traverse speed, a control element mounted for angular and also axial movement, manually operable means by which said element may be shifted into a plurality of axial positions, means operable in the angular motion of said element with the latter in one of said positions to govern the operation of said driving mechanism in a predetermined cycle during which said movable support is moved away from and back to a starting position in a combination of rapid approach, feed, and rapid return motions, similarly acting means operable in the angular movement of the element in another of said positions to define a different cycle of such motions, and means responsive to relative motion between said supports to advance said element angularly when in either of said positions.

14. An automatic machine tool having, in combination, a support for a tool, a work support, feeding means for effecting relative movement between said supports, power actuated mechanism operating through the medium of said feeding means to move said supports relative to each other at a slow cutting speed and at rapid traverse speeds in opposite directions, means for controlling said mechanism to determine the character and direction of such relative motion, means responsive to relative movement between said supports to actuate said control means and define a predetermined cycle of feed and rapid traverse motions, a second means responsive to relative movement between said supports for actuating said control means to cause execution of a cycle having relative motions of different character, and means movable independently of either of said supports for rendering one or the other of said means operable selectively.

15. An automatic machine tool having, in combination, a support for a tool, a support for a work piece, one of said supports being movable along slideways, power driven mechanism operable selectively to advance the movable support in either direction either at a slow cutting speed during operative engagement of the tool and work or a rapid traverse speed, control means responsive to the movements of said support and operable to govern the operation of said mechanism whereby to define an automatic cycle of rapid approach, feed, and rapid return movements of said movable support, control means responsive to the movements of said movable support and operable to govern said mechanism whereby to define a cycle of rapid approach, feed, reverse feed, and rapid return movements of said movable support, means for initiating operation of said mechanisms in each cycle independently of said control means, and a manually operable member shiftable into either of said positions selectively to render one or the other of said control means effectual.

16. An automatic machine tool having, in combination, a frame, a machine element mounted on said frame for movement back and forth, power driven mechanism for moving said element at a slow cutting rate or at a rapid traverse rate in opposite directions, control means governing the selective operation of said mechanism, a member mounted for angular motion through a plurality of positions and also for axial movement into a plurality of positions, and cam means on said member acting upon angular movement thereof while in the respective axial positions to actuate said control means and cause said mechanism to execute different cycles during each of which said element is moved away from and back to a starting position in a combination of feed and traverse motions.

17. An automatic machine tool having, in combination, a frame, a machine element mounted on said frame for movement back and forth, power driven mechanism for moving said element at a slow cutting rate or at a rapid traverse rate in opposite directions, control means governing the selective operation of said mechanism, a member mounted for angular motion through a plurality of positions and also for axial movement into a plurality of positions, and cam means on said member acting upon angular movement thereof while in the respective axial positions to actuate said control means and cause said mechanism to execute different cycles during each of which said element is moved away from and back to a starting position in a combination of feed and rapid traverse motions, and selectively operable means by which said member may be moved manually into any one of said angular and axial positions.

18. An automatic machine tool having, in combination, a frame, a machine element mounted on said frame for movement back and forth, power driven mechanism for moving said element at a slow cutting rate during engagement of the tool and work piece or at a rapid traverse rate in opposite directions, control means governing the selective operation of said mechanism, a member mounted for movement through a plurality of positions and also for transverse movement into a plurality of positions, and cam means on said member acting upon movement through a plurality of said first mentioned positions while in the respective second mentioned positions to actuate said control means and cause said mechanism to execute different cycles during each of which said element is moved away from and back to a starting position in a combination of feed and rapid traverse motions.

19. An automatic machine tool having, in combination, a frame, a machine element mounted on said frame for movement back and forth, power driven mechanism for moving said element at a slow cutting rate or at a rapid traverse rate in opposite directions, control means governing the selective operation of said mechanism, a member mounted for movement through a plurality of positions and also for transverse movement into a plurality of positions, cam means on said member acting upon movement through a plurality of said first mentioned positions while in the respective second mentioned positions to actuate said control means and cause said mechanism to execute different cycles during each of which said element is moved away from and back to a starting position in a combination of feed and rapid traverse motions, and a single handle by which said member may be shifted selectively into any one of said first and second mentioned positions.

20. An automatic machine tool having, in combination, a support for a tool, a work support, means mounting said supports for relative movement, means for producing such movement at a slow cutting speed or a rapid traverse speed in opposite directions including electric motor driving means, mechanism responsive to the relative movements between said supports and controlling the operation of said driving means to define any one of a plurality of different cycles each comprising a combination of feed and rapid traverse motions including an element mounted for unidirectional step-by-step movement through a plurality of positions in which different parts of a cycle are executed, selectively operable means for conditioning said control mechanism for the execution of any one of said cycles, and means associated with said element for indicating the cycle for which said mechanism is set and each successive part of a cycle as it is being executed.

21. An automatic machine tool having, in combination, a frame, a machine element mounted on said frame for movement back and forth, power driven mechanism for moving said element at a slow cutting rate or at a rapid traverse rate in opposite directions, control means governing the selective operation of said mechanism, a member mounted for angular motion through a plurality of positions and also for axial movement into a plurality of positions, means on said member acting upon angular movement thereof while in the respective axial positions to actuate said control means and cause said mechanism to execute different cycles during each of which said element is moved away from and back to a starting position in a combination of feed and rapid traverse motions, and means indicating the axial and angular positions of said member whereby to enable the cycle and the character of the motion being executed to be ascertained when said member is in any one of said positions.

22. An automatic machine tool having, in combination, a frame, a machine element mounted on said frame for movement back and forth, power driven mechanism for moving said element at a slow cutting rate or at a rapid traverse rate in opposite directions, control means governing the selective operation of said mechanism, a member mounted for movement in one direction and also for transverse movement through a plurality of positions, means on said member acting upon movement in said first mentioned direction while in the respective positions to actuate said control means and cause different operating cycles of feed and rapid traverse to be executed by said element, and a single indicator responsive to the movements of said member to indicate the cycle for which said member is set and the part of the cycle being executed.

23. An automatic machine tool having, in combination, a frame, a machine element mounted on said frame for movement back and forth, power driven mechanism for moving said element at a slow cutting rate or at a rapid traverse rate in opposite directions, control means governing the selective operation of said mechanism, a member having a plurality of cams arranged thereon in sets and respectively adapted in the advance of the member to actuate said control means selectively to define different cycles comprising combinations of feed and rapid traverse motions, manually operable means for rendering said sets of cams operable selectively, and means operable automatically to indicate at all times which of said sets of cams is active and which part of the cycle is being executed.

24. An automatic machine tool having, in combination, a frame, a machine element mounted on said frame for movement back and forth, power driven mechanism for moving said element at a slow cutting rate or at a rapid traverse rate in opposite directions, control means governing the selective operation of said mechanism to define any one of a plurality of cycles in each of which said element is moved away from and back to a starting position in a combination of feed and rapid traverse motions, selectively operable means for conditioning said mechanism for the execution of any one of said cycles and means indicating the cycle for which said mechanism is set and the part of the cycle being executed in any position of said element.

25. An automatic machine tool having, in combination, a frame, a machine element mounted on said frame for movement back and forth, power driven mechanism for moving said element at a slow cutting rate or at a rapid traverse rate in opposite directions, control means governing the selective operation of said mechanism, a single control member for actuating said control means and movable along one path to cause a predetermined combination of feed and rapid traverse motions to be executed and into different positions in a different path to change the combination of motions executed during motion along said first mentioned path, and means for indicating the position of said member along each of said paths.

26. An automatic machine tool having, in combination, a frame structure, a support carrying a tool or a work piece and translatably mounted on said structure, a unitary power driving mechanism including feed and rapid traverse motors, and feeding mechanism actuated thereby for imparting the motions thereof to said element, a plurality of switches governing the selective operation of said motors to produce feed and rapid traverse motions of said support, a frame member, a control element rotatably mounted on said member in operative association with said switches and carrying means for actuating said switches to define a cycle of rapid approach, feed, and rapid return motions of said support, a second control element mounted rotatably on said member and carrying control devices spaced according to the relative lengths of the motions to be executed, means on said member actuated by said devices for advancing said control element step-by-step, and a detachable rotary driving connection between said second control element and said support, said member, said control elements, and the connections therebetween constituting a separate sub-assembly removable as a unit from the machine tool.

27. An automatic machine tool having, in combination, a frame structure, a machine element translatably mounted on said frame structure, motor driven mechanism arranged to actuate said element to cause relative approaching and receding motion between the work and tool at a rapid rate or to cause relative movement at a slow cutting rate, and a unitary cycle controlling mechanism comprising a member demountably supported from said frame structure, a plurality of switches controlling the selective operation of said mechanism and mounted on said member, a control device mounted on said member and movable relative thereto to actuate said switches selectively and define a predetermined cycle of rapid approach, feed and rapid return motions of said element, and means providing a detachable driving connection between said element and said control device whereby to permit removal of said cycle-controlling mechanism as a unit by detachment of said member.

28. An automatic machine tool having, in combination, a frame structure, a machine element mounted on said frame structure for movement back and forth, feed and rapid traverse motors mounted on said frame, means for combining the motions of said motors and applying the same to said element to cause movements thereof in opposite directions at slow cutting and rapid traverse speeds, and mechanism controlling the selective operation of said motors comprising a plurality of switches, switch actuating means responsive to movements of said support for actuating said switches to cause a predetermined combination of feed and rapid traverse motions to be executed, and a member forming a common means for supporting said switches and said actuating means in operative association, said member being supported from said frame structure and detachable therefrom whereby to permit removal of the motor control mechanism as a unit.

29. An automatic machine tool having, in combination, a frame structure, a machine element mounted on said structure for movement back and forth, means for feeding said element, power driven mechanism arranged to actuate said feeding means to move said element at a slow cutting speed or at rapid traverse speeds in opposite directions, means for controlling the selective operation of said mechanism, a ratchet wheel, means responsive to movement of said element including a pawl reciprocated periodically in the movement of the element by said mechanism, a shaft with cams thereon operable to actuate said control means and cause a predetermined cycle of feed and rapid traverse motions of said element to be executed, and a coupling for rotating said shaft from ratchet wheel while permitting removal of the shaft from said frame structure independently of said ratchet wheel and while the latter remains in operative association with said pawl.

30. An automatic machine tool having, in combination, a machine element mounted for movement back and forth to effect a metal-removing operation, electric feed and rapid traverse motors having driving connections with said element and operable singly or in combination to cause movement of said element at slow cutting and rapid traverse speeds in opposite directions, reversing switch mechanism controlling the application of current to both of said motors for starting the same simultaneously, manually operable means by which said mechanism may be controlled to initiate operation of said motors in any position of said element, means responsive to the movements of said element for controlling said mechanism to determine the direction and extent of operation of said motors, reversing mechanism controlling said rapid traverse motor to initiate and terminate the operation thereof and to determine the direction of such operation when said feed motor is operating, means responsive to the movement of said element to actuate said last mentioned mechanism selectively, and manually operable means by which said first mentioned reversing mechanism may be controlled to interrupt the operation of both of said motors in any position of said element.

31. An automatic machine tool having, in combination, a frame structure, a machine element mounted on said frame structure for back and forth movement, driving means comprising electric feed and rapid traverse motors arranged to impart motion to said element at a slow cutting speed or at rapid traverse speed in opposite directions, a relay switch having a winding adapted when energized to initiate operation of one of said motors, a circuit for energizing said winding including a manually operable switch by which the circuit may be closed, a circuit for maintaining energization of said winding extending through said relay switch and including a normally closed manually operable switch and a switch responsive to the movements of said element, a circuit controlling the energization of the second motor extending through said relay switch and separate from said first mentioned circuit whereby the operation of both of said motors is controllable by said manually operable switches in all positions of said element, and a switch in said last mentioned circuit responsive to the movement of said element for controlling the circuit when said relay winding is energized.

32. An automatic machine tool having, in combination, a frame structure, a reciprocable machine element mounted thereon, an electric motor connected to the element to feed the same at a slow cutting speed, a reversible electric motor connected to said element to advance the same at rapid traverse speed in opposite directions, a relay switch including a magnet and adapted when energized to initiate operation of said feed motor, circuits for said rapid traverse motor extending through relay switch and having switches therein selectively operable to cause operation of the rapid traverse motor in one direction or the other whereby operation of the rapid traverse motor is conditioned upon energization of said magnet and the direction of operation is determined by said switches, means responsive to the movements of said element for operating said rapid traverse switches selectively, an energizing circuit for said magnet including a manually operable switch, and a locking circuit for maintaining energization of said magnet including a switch closed by energization of the magnet.

33. An automatic machine tool having, in combination, a frame structure, a machine element mounted on said frame structure for movement back and forth in cycles of feed and rapid traverse motions, driving means comprising feed and rapid traverse motors selectively operable to impart motions to said element at a slow cutting speed or at rapid traverse speeds in opposite directions, switching means controlling the selective operation of said motors, mechanism responsive to the movements of said element for controlling said switching means to define a predetermined cycle of rapid approach, feed, and rapid return motions of the element, manually operable means associated with said switching means for initiating operation of said driving means, and a normally closed manually controllable switch upon which the subsequent operation of said driving means is dependent through all of said motions whereby the cycle may be interrupted at any point by opening of said switch.

34. An automatic machine tool having, in combination, a frame, a machine element mounted for movement back and forth on said frame, power driven mechanism for moving said element at a slow cutting speed during engagement of the tool and work and at rapid traverse speeds in opposite directions, means for controlling said mechanism to define a cycle of feed and rapid traverse motions of said element, a member demountable as a unit from said frame structure and having a succession of spaced dogs mounted thereon and arranged for adjustment relative to each other to vary the relative lengths of said motions, a control member for actuating said control means positioned for engagement with said dogs, one of said members being mounted for movement in unison with the movements of said element whereby the dogs are presented successively to said control member, and means supporting said dog-supporting member for independent adjustment relative to the control member whereby the relation of all of the dogs to said control member may be changed simultaneously.

35. An automatic machine tool having, in combination, a frame, a machine element mounted for movement back and forth on said frame, power driven mechanism for moving said element at a slow cutting speed and at rapid traverse speeds in opposite directions, means for controlling said mechanism to define feed and rapid traverse motions of said element, a shaft oscillated back and forth in the movements of said element, a disk removably mounted on said shaft for rotation therewith but adapted for independent angular adjustment relative thereto, a plurality of control dogs annularly spaced around said disk and individually adjustable circumferentially thereof, and means engaged by the successive dogs in the advance of said shaft to operate said control means.

36. An automatic power driven machine tool having, in combination with a machine element to be reciprocated, an electric motor, means providing a driving connection between said motor and said element for feeding the latter at slow speeds during operative engagement of a tool and work piece including mechanism selectively operable to produce a plurality of different rates of feed and a magnet adapted when energized to change the feed from one of said rates to the other, a second motor operable to move said support along said slideway at rapid traverse speed, switching means operable to govern the operation of said motors, means responsive to the movement of said element to control said switching means whereby to define a predetermined cycle of feed and rapid traverse motions, and means responsive to the movement of said element for controlling the energization of said magnet whereby to change from one feed rate to another automatically at a predetermined point in the cycle.

37. An automatic power driven machine tool having, in combination with a reciprocable machine element, electric motor driving means, means providing a driving connection between said driving means and said element for moving said element at a rapid traverse speed and for feeding the latter at slow speeds during operative engagement of a tool and work piece including mechanism selectively operable to produce a plurality of different rates of feed, and a magnet for operating said mechanism to produce one rate of feed when energized and a different feed rate when deenergized, means operable in response to the movements of said element to control said driving means and define a predetermined cycle of feed and rapid traverse motions, and means responsive to the movements of said element for controlling the energization of said magnet.

38. An automatic power driven machine tool having, in combination with a reciprocable machine element, an electric motor, means providing a mechanical driving connection between said motor and said element for moving the latter at slow feeding speeds including speed-change gearing selectively operable to produce different rates of feed and a member movable into different positions to change from one of said rates to the other, a second motor operable to move said support along said slideway at rapid traverse speed, switching means operable to govern the selective operation of said motors, a plurality of control dogs responsive to the movement of said element to control said switching means to define a predetermined cycle of feed and rapid traverse motions, and means operating automatically when one of said dogs is rendered active to change the position of said member.

39. An automatic power driven machine tool having, in combination with a reciprocable machine element, electric motor driving means, means providing a driving connection between said driving means and said element for moving said element at a rapid traverse speed and for feeding the latter at slow speeds during operative engagement of a tool and work piece including mechanism selectively operable to produce a plurality of different rates of feed by movement of a control member into different positions, control means responsive to the movement of said element and operable to define a predetermined cycle of rapid approach, feed and rapid return motions of the element, and means responsive to the movement of said element for shifting said member from one position to another at a predetermined point in said cycle whereby to change from one feed rate to another automatically.

40. An automatic power driven machine tool having, in combination with a reciprocable machine element, electric motor driving means, means providing a driving connection between said driving means and said element for moving said element at a rapid traverse speed and for feeding the latter at slow speeds during operative engagement of a tool and work piece including mechanism selectively operable to produce a plurality of different rates of feed, cam means operable in response to movements of said element to control said driving means and define a predetermined combination of rapid approach, feed, and rapid return motions, and cam means associated with said last mentioned means to control said mechanism and change the rate of the feed motion during said cycle.

41. A machine tool having, in combination, a frame structure, a machine tool element movably mounted on said frame structure, and mechanism for moving said member at a slow cutting speed or at rapid traverse speed comprising a casing supported by said frame structure having a recess in one wall, a feed motor, a rapid traverse motor mounted in said casing with its shaft projecting toward said recess, a frame detachably secured to said casing in said recess, a friction brake having relatively rotatable and nonrotatable friction elements mounted on said frame with the rotatable element detachably coupled to said shaft, spring means normally acting to apply said brake, and a magnet mounted on said frame and arranged to be energized when the rapid traverse motor is excited and operable to release said brake, said brake, said magnet and the brake-actuating means constituting a unitary sub-assembly removable as a unit from said casing upon detachment of said frame therefrom.

42. A machine tool having, in combination, a frame structure, a machine tool element movably mounted on said frame structure, and mechanism for moving said member at a slow cutting speed or at rapid traverse speed comprising a casing supported by said frame structure, a feed motor, a rapid traverse motor mounted in said casing, a frame detachably secured to said casing, a friction brake having relatively rotatable and non-rotatable friction elements mounted on said frame with the rotatable element detachably coupled to said shaft, spring means normally acting to apply said brake, a magnet arranged to be energized when the rapid traverse motor is excited and operable to release the brake against the action of said spring means, and means on said frame for adjusting the relation of said friction elements while said frame is attached to said casing, the brake assembly being removable as a unit from said casing upon detachment of said frame therefrom.

43. A machine tool having, in combination, a frame structure with a reciprocatory machine element mounted thereon, a rotary spindle element on said frame structure for effecting relative rotation between a tool and a work piece, a casing supported by said frame structure and having a recess in one wall, an electric motor having a driving connection within said casing extending to one of said elements and including driving and driven shafts with ends disposed adjacent said opening and provided with coupling members by which the shafts may be connected by pick-off gears removable from the exterior of said casing, a separate detachable gear unit adapted to be secured to said casing adjacent said recess and including speed-change gearing having driving and driven elements mounted for relative rotation about a common axis, the driven element being detachably coupled to said driven shaft, and means removably mounted on said driving shaft for extending the drive from the driving shaft to said driving element whereby said shafts may be connected either by said pick-off gears or by said unit.

44. A machine tool having, in combination, a frame structure with a reciprocatory machine element mounted thereon, a rotary spindle element on said frame structure for effecting relative rotation between a tool and a work piece, a casing supported by said frame structure, an electric motor having a driving connection within said casing extending to one of said elements and including driving and driven members adapted to be connected and disconnected manually from a point exteriorly of the casing, a separate detachable casing adapted to be secured detachably to said casing adjacent said members, speed-change gearing having driving and driven elements mounted for relative rotation about a common axis, the driven element being detachably coupled to said driven member, and means removably mounted on said driving member for extending the drive from the driving shaft to said driving element.

45. A machine tool having, in combination, a frame structure with a reciprocatory machine element mounted thereon, a rotary spindle element on said frame structure for effecting relative rotation between a tool and a work piece, a casing supported by said frame structure and having a recess in one wall, an electric motor having a driving connection within said casing extending to one of said elements and including driving and driven shafts with ends disposed adjacent said opening and provided with coupling members by which the shafts may be connected by pick-off gears removable from the exterior of said casing, a separate detachable speed-change unit adapted to be secured detachably to said casing adjacent said recess and including relatively rotatable driving and driven elements arranged to be coupled to said driving and driven shafts respectively upon attachment of said unit to said casing whereby said unit may be substituted for said pick-off gears and utilized as a means for connecting said shafts.

46. A machine tool having, in combination, a frame structure with a reciprocatory machine element mounted thereon, a rotary spindle element on said frame structure for effecting relative rotation between a tool and a work piece, a casing supported by said frame structure, an electric motor having a driving connection within said casing extending to one of said elements and including driving and driven members adapted to be connected and disconnected manually from a point exteriorly of said casing, and a separate detachable speed-change unit adapted to be secured detachably to said first mentioned casing adjacent said members and having driving and driven elements arranged to be coupled to said driving and driven members as an incident to attachment of said unit to said casing.

47. A machine tool having, in combination, a frame structure with a reciprocatory machine element mounted thereon, a casing supported by same frame structure and having a recess in one wall, an electric motor having a driving connection for effecting movement of said element at a slow cutting speed and including driving and driven shafts in said casing with their ends disposed adjacent said recess and provided with coupling members arranged to be connected by pick-off gears removable from a point exteriorly of said casing, an auxiliary casing secured to said first mentioned casing adjacent said recess, two gear trains of different ratios within said auxiliary casing having driving and driven elements detachably coupled to said shafts, clutch means associated with said gear trains within said auxiliary casing and operable selectively to render one or the other of the trains effectual, said auxiliary casing and the parts mounted thereon constituting a unitary structure removably mounted on said main casing and usable interchangeably with said pick-off gears.

48. A machine tool having, in combination, a frame structure with a reciprocatory machine element mounted thereon, a casing supported by said frame structure, an electric motor having a driving connection for effecting movement of said element at a slow cutting speed including driving and driven members within said casing arranged to be connected by pick-off gears removable from a point exteriorly of the casing, and a selectively variable speed-change unit adapted to be secured to said casing adjacent said members including two gears trains of different ratios having driving and driven elements detachably coupled to said members and clutch means associated with said gear trains and operable selectively to render one or the other of the trains effectual, said unit being removably mounted on said main casing and usable interchangeably with said pick-off gears.

49. A machine tool having, in combination, a frame structure, a machine element mounted thereon for movement back and forth, a support, an electric feed motor mounted on said support, mechanism on said support driven by said motor for effecting movement of said element at a slow cutting speed during engagement of a tool and work piece including parallel driving and driven members respectively connected to said motor and said element and provided with coupling elements by which the members may be connected and disconnected selectively, an auxiliary support adapted to be secured detachably to said first mentioned support, and speed-change gearing on said auxiliary support having driving and driven elements detachably coupled to said driving and driven members respectively when said supports are secured together, said gearing including interchangeable pick-off gears interposed in the gearing between said driving and driven elements.

50. A machine tool having, in combination, a frame structure with a reciprocatory machine element mounted thereon, a rotary spindle element on said frame structure for effecting relative rotation between a tool and a work piece, a casing supported by said frame structure and having a recess in one wall, an electric motor having a driving connection within said casing extending to one of said elements and including driving and driven shafts with their ends disposed adjacent said recess and provided with coupling members, a plurality of structurally separate speed-change units each embodying speed-reduction gearing and adapted to be mounted on said casing adjacent said shafts, each unit having driving and driven elements arranged to be coupled to said members in the attachment of the unit to said casing whereby said units may be used interchangeably for connecting said shafts.

51. An automatic machine tool having, in combination, a frame structure having thereon a part to be reciprocated, a hollow casing supported by said frame structure and having a recess in one wall thereof, two motors with rotary drive connections with said casing, an auxiliary casing detachably secured to said first mentioned casing and covering said recess, a third motor mounted on said auxiliary casing, a rotary driving connection extending into said first mentioned casing through said recess including speed-reduction gearing within the auxiliary casing, a tool unit mounted adjacent said main casing and carrying a rotary tool spindle driven from the driving connection of one of said motors, and feeding mechanism driven from said other connections and operable to combine the motions of said other motors and move said part at feed and rapid traverse speeds.

52. A machine tool having, in combination, a frame structure with a reciprocatory machine element mounted thereon, a rotary spindle element on said frame structure for effecting relative rotation between a tool and a work piece, a casing supported by said frame structure and having a recess in one wall, an electric motor having two driving connections within said casing respectively extending to said elements, one of said connections including driving and driven shafts with ends disposed adjacent said recess and provided with coupling members by which the shafts may be connected by gearing removable from the exterior of said casing, an auxiliary power unit attached to the exterior of said casing adjacent said recess and including an electric motor and a rotary driving member detachably coupled to said driven shaft.

53. A machine tool having, in combination, a frame structure with a reciprocatory machine element mounted thereon, a rotary spindle element on said frame structure for effecting relative rotation between a tool and a work piece, a casing supported by said frame structure, an electric motor having two driving connections within said casing respectively extending to said elements, one of said connections including driving and driven elements arranged for disconnection from a point exteriorly of said casing, an auxiliary casing attached to the exterior of said casing adjacent said members and having an opening therein, speed-reduction gearing within said auxiliary casing having a driven element detachably coupled to said driven member and a driving element adapted for connection to said driving member, and an auxiliary power unit detachably mounted on one of said casings and including an electric motor having a drive shaft detachably coupled to said driving element.

54. A machine tool having, in combination, a frame structure with a reciprocatory machine element mounted thereon, a rotary spindle element on said frame structure for effecting relative rotation between a tool and a work piece, a casing supported by said frame structure, an electric motor having driving connections within said casing extending to one of said elements, one of said connections having driving and driven members arranged for manual disconnection from a point exteriorly of said casing including driving and driven members, an auxiliary power unit attached to the exterior of said casing adjacent said members and including an electric motor and a rotary driving element detachably coupled to said driven member.

55. A machine tool having, in combination, a frame structure providing a slideway, a machine element mounted for movement back and forth in said slideway, electric motor driving means arranged to move said element at a slow cutting speed during operation of the tool upon the work and at rapid traverse speed, mechanism for controlling the operation of said driving means to define a cycle of feed and rapid traverse motions of said element, a series of dogs spaced according to the lengths of different parts of said cycle and operable to actuate said control mechanism, means for distributing lubricating fluid to the surfaces of said slideway including a pump, and means actuated by certain of said dogs for operating said pump.

56. A machine tool having, in combination, a frame structure providing a slideway, a machine element mounted for movement back and forth in said slideway, electric motor driving means arranged to move said element at a slow cutting speed during operation of the tool upon the work and at rapid traverse speed, mechanism for controlling the operation of said driving means to define a cycle of feed and rapid traverse motions of said element including a member mounted for unidirectional movement, a series of dogs spaced according to the lengths of different parts of said cycle and operable to advance said member step-by-step during movement of the element in opposite directions, means for distributing lubricating fluid to the surfaces of said slideway including a pump, and means actuated in certain stepping movements of said member for operating said pump.

57. A machine tool having, in combination, a frame structure providing a slideway, a machine element mounted for movement back and forth, electric motor driving means arranged to move said element at a slow cutting speed during operation of the tool upon the work and at rapid traverse speed, mechanism responsive to the movement of said element and operable to control the operation of said driving means to define a cycle of feed and rapid traverse motions of said element, means for distributing lubricating fluid to the surfaces of said slideway, and means operated automatically by said mechanism for delivering lubricating fluid to said distributing means in quantities determined by the character of the operating cycle defined thereby.

58. A machine tool having, in combination, a frame structure providing a slideway, a machine element mounted for movement back and forth in said slideway, electric motor driving means arranged to move said element at a slow cutting speed during operation of the tool upon the work and at rapid traverse speed, mechanism responsive to the movement of said element and operable to control the operation of said driving means to define a cycle of feed and rapid traverse motions of said element, means for distributing lubricating fluid to the surfaces of said slideway, a pump having a reciprocatory piston and arranged to deliver fluid to said system, and means operated automatically by said driving means to impart a plurality of reciprocatory movements to said piston during each of said cycles, certain of said reciprocations occurring during movement of said element in one direction and others occurring during movement in the opposite direction.

59. A machine tool having, in combination, a frame structure providing a guideway, a tool head mounted to slide back and forth along said guideway, motor driven mechanism on said head for moving the same at a slow cutting speed or at rapid traverse speed including an elongated feed element stationarily mounted on said frame structure and a cooperating feed element rotatably mounted on said head, and means for lubricating said guideway and said feed elements automatically including passageways on said head terminating adjacent the guideways and the stationary feed element, and pump means actuated by said driving means as an incident to movement of said head to supply lubricant to said passageways.

60. A machine tool having, in combination, a frame structure providing a guideway, a tool head mounted to slide back and forth along said guideway, motor driven mechanism on said head for moving the same at a slow cutting speed or at rapid traverse speed including an elongated feed element stationarily mounted on said frame structure and a cooperating feed element rotatably mounted on said head, and means contained within said head and operating automatically as an incident to movement of the head to supply lubrication fluid to said guideway and also to the stationary feed element.

61. A machine tool having, in combination, means providing spaced slideways, a support mounted to slide along said ways and carrying a tool to be actuated, a separately formed casing detachably secured to said support for movement therewith, power driven mechanism within said casing operable to move said support back and forth along said slideway, a reservoir for lubricating fluid disposed within said casing, a pump within said casing operable automatically as an incident to movement of said support to withdraw fluid from said reservoir, a conduit carried by said casing having an inlet receiving fluid from said pump and an outlet opening outwardly from said casing, a conduit on said support leading to one of said slideways and having an inlet opening adapted, when the casing is attached to said support, to register with said outlet opening.

62. An automatic machine tool having, in combination, a supporting frame, a tool unit demountably secured to said frame and having a spindle for supporting a cutting tool, a hollow casing on said frame structure, a separately formed plate constituting an end wall for said casing and detachably secured to said tool unit, feed and rapid traverse motors housed within the opposite end of said casing with their shafts mounted to turn on parallel axes, means for extending the drive of said feed motor through said tool unit to said spindle, a rotary feed member mounted on said casing and adapted to transmit feeding motions to a point exteriorly of the casing, and means within the casing for combining the motions of said motors and applying the same to said feed member.

63. A machine tool having, in combination, a frame structure, a machine element mounted thereon for movement back and forth, a separately formed casing demountable as a unit from said frame structure, electric motor driving means mounted in the casing, a nut rotatably supported by said casing and having one end exposed exteriorly of the casing with an element of a shaft coupling thereon, means within the casing providing a rotary driving connection between said driving means and said nut, said nut being adapted to receive interchangeably a screw for causing the transmission of reciprocatory motion to said machine element or a shaft engageable with said coupling element for transmitting rotary power to said machine element.

64. A machine tool having, in combination, a frame structure, a machine element such as a tool support mounted thereon for movement back and forth, a hollow casing on said frame structure having a lower portion constituting a reservoir for lubricating fluid, a member rotatably supported in said lower portion and extending exteriorly of said casing, means disposed outside of said casing and connected to said member for transmitting power to said element, electric motor driving means, gearing within said casing connecting said driving means and said member and lubricated by the fluid in the reservoir, and means providing an oil seal acting to prevent the flow of said fluid from the casing along the joint between the casing and said member.

65. A quick convertible automatic machine tool comprising, in combination, a frame structure, a tool support mounted on said frame structure for movement relative to a work piece, a plurality of laterally spaced spindles rotatably mounted on said support and arranged to support interchangeably tools for performing different metal-removing processes, power means for rotating said spindles and advancing said support at feed and rapid traverse rates including selector means by which the rates of rotation and feed may be adjusted in predetermined ratios for the efficient performance of the different processes, mechanism responsive to the movements of said support for controlling the operation of said driving means and selectively changeable to define any one of a plurality of predetermined combinations of motions of said spindles whereby said machine tool may be adapted readily for the performance of a different process by changing the tool, the feed and drive rates therefor and the cycle of movements of the support.

66. An interchangeable multiple spindle drilling and tapping machine combining a reciprocably mounted tool head, a plurality of spaced spindles rotatably journaled in said head for connection selectively either with drilling or tapping tools, electric motor driving means on said head, mechanical feed elements arranged for relative rotation to impart positive feed motions to said head, means extending the drive from said driving means to said spindles and to one of said feed elements and operable selectively to drive said spindles and rotatable feed element in synchronism and at different selected speeds for efficient drilling and tapping operations, and a cycle control mechanism governing the operation of said driving means and arranged to be conditioned readily for causing movement of said head either in a cycle of rapid approach, feed, reverse feed, and rapid return motions, or a cycle of rapid approach, feed, and rapid return motions whereby to permit of quick adaptation of the machine for the performance of drilling or tapping operations on portions of a work piece corresponding to the spacing of said spindles.

67. An interchangeable multiple spindle drilling and tapping machine combining a reciprocably mounted tool head, a plurality of spaced spindles rotatably journaled in said head for connection selectively either with drilling or tapping tools, an electric motor on said head, means driven by said motor to rotate said spindles and feed said head back and forth positively at a cutting rate and in synchronism with the tool rotation, other power actuated means for causing rapid traverse motions to be imparted to said head, and means controlling said motor and driving means automatically to produce feed and rapid traverse motions in opposite directions, and manually operable means by which said controlling means may be conditioned readily for causing execution of either a tapping cycle of rapid approach, forward feed, reverse feed, and rapid return motions or a drilling cycle of rapid approach, forward feed, and rapid return motions.

68. An interchangeable multiple spindle drilling and tapping machine combining a reciprocably mounted tool head, a plurality of spindles rotatably journaled in said head for connection selectively either with drilling or tapping tools, electric motor driving means on said head, mechanical feed elements arranged for relative rotation to impart positive feed motions to said head, means extending the drive from said driving means to said spindles and one of said feed elements and operable selectively to drive said spindles and rotatable feed element in synchronism and at different selected speeds for efficient drilling and tapping operations, and a common cycle control mechanism governing the operation of said driving means and arranged to be conditioned readily for causing movement of said head either in a cycle of rapid approach, feed, reverse feed, and rapid return motions, or a cycle of rapid approach, feed and rapid return motions, and manually shiftable means by which said mechanism and the spindle may be conditioned readily for causing execution of either of said cycles at speeds corresponding to the cycle selected.

69. An automatic machine tool having, in combination, a frame structure, a machine element mounted on said frame structure for movement back and forth in cycles of feed and rapid traverse motions, electric motor driving means selectively operable to impart motions to said element at slow cutting speed or at rapid traverse speed in opposite directions, switching means controlling the selective operation of said driving means, mechanism responsive to the movements of said element for controlling said switching means to define a predetermined cycle of rapid approach, feed, and rapid return motions of the element, an electromagnet adapted to initiate said cycle when energized, an energizing circuit for said magnet adapted to be closed by a normally open manually controllable switch, a parallel locking circuit for said magnet including a switch which is closed when said magnet is energized and a second switch, and means operated by said mechanism to open said second switch momentarily to terminate the cycle and leave the switch closed at the end of the cycle.

70. An automatic machine tool having, in combination, a frame structure, a machine element mounted on said frame structure for movement back and forth in cycles of feed and rapid traverse motions, electric motor driving means selectively operable to impart motions to said element at a slow cutting speed or at rapid traverse speeds in opposite directions, switching means controlling the selective operation of said driving means, mechanism responsive to the movements of said element for controlling said switching means to define a predetermined cycle of rapid approach, an electromagnet adapted to initiate said cycle when energized, an energizing circuit for said magnet adapted to be closed by a normally open switch, a second electromagnet adapted when energized to close said switch, a parallel maintaining circuit for said magnet including a switch which is closed when said magnet is energized and a second switch, and means operated by said mechanism to open said last mentioned switch momentarily to terminate the cycle and leave the switch closed at the end of the cycle.

71. An automatic machine tool having, in combination, a work support, a support for a tool, feeding means for effecting relative movement between said supports, power actuated mechanism for operating said feeding means to produce relative movements of different characters between said supports, a set of control dogs spaced in accordance with the lengths of the movements to be executed between said supports and rendered operative progressively in response to relative movement between said supports, a series of cams actuated in response to said dogs in the relative movement between said supports and operable to control said mechanism and produce relative movements of different character, and means changeable selectively and independently of said dogs to render various combinations of said cams operative for definite different predetermined machine cycles in response to the action of said dogs.

72. An automatic machine tool having, in combination, a work support, a support for a tool, feeding means for effecting relative movement between said supports, power actuated mechanism for operating said feeding means to produce relative movements of different characters between said supports, a set of control dogs spaced in accordance with the lengths of the movements to be executed between said supports and rendered operative progressively in response to relative movement between said supports, and means actuated by said dogs to define different combinations of motions between said supports and arranged to be conditioned selectively for the performance of any one of a plurality of different combinations of motions in response to the action of the same set of control dogs.

ALEXANDER OBERHOFFKEN.